US012696053B2

(12) United States Patent
Legallais et al.

(10) Patent No.: US 12,696,053 B2
(45) Date of Patent: Jul. 28, 2026

(54) METHODS, APPARATUSES AND SYSTEMS DIRECTED TO DYNAMIC USE OF MULTICAST RADIO RESOURCES

(71) Applicant: InterDigital Patent Holdings, Inc., Wilmington, DE (US)

(72) Inventors: Yvon Legallais, Rennes (FR); Franck Aumont, Vern sur Seiche (FR); Remi Houdaille, Cesson Sevigne (FR); Jean Le Roux, Rennes (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 321 days.

(21) Appl. No.: 18/280,758

(22) PCT Filed: Mar. 7, 2022

(86) PCT No.: PCT/EP2022/055729
§ 371 (c)(1),
(2) Date: Sep. 7, 2023

(87) PCT Pub. No.: WO2022/189346
PCT Pub. Date: Sep. 15, 2022

(65) Prior Publication Data
US 2024/0147192 A1 May 2, 2024

(30) Foreign Application Priority Data
Mar. 11, 2021 (EP) .................................... 21305297

(51) Int. Cl.
*H04W 4/00* (2018.01)
*H04W 4/06* (2009.01)
(Continued)

(52) U.S. Cl.
CPC ............. *H04W 4/06* (2013.01); *H04W 72/30* (2023.01); *H04W 76/40* (2018.02)

(58) Field of Classification Search
USPC .................................................. 370/329, 330
See application file for complete search history.

(56) References Cited

U.S. PATENT DOCUMENTS

2008/0014925 A1    1/2008  Van et al.
2009/0098896 A1    4/2009  Park
(Continued)

OTHER PUBLICATIONS

"3rd Generation Partnership Project; Technical Specification Group Services and System Aspects; Study on architectural enhancements for 5G multicast-broadcast services, (Release 17)", 3GPP TR 23.757 V1.1.0, Oct. 2020, 274 pages.
(Continued)

*Primary Examiner* — Chuong T Ho
(74) *Attorney, Agent, or Firm* — Volpe Koenig

(57) ABSTRACT

Methods, apparatuses, systems, etc., directed to a dynamic use of multicast radio resources are disclosed herein. In an embodiment, a method, implemented by a WTRU, for receiving multicast and broadcast service, MBS, from a RAN node, comprises: receiving MBS service announcement information, the MBS service announcement information comprising, per announced MBS service, information representative of service components; selecting an announced MBS service and at least one service component of the selected MBS service; transmitting a message to receive the selected MBS service, the message comprising selected service component(s) of the selected MBS service; and under condition that the selected MBS service is available, receiving the selected service component(s) of the selected MBS service.

18 Claims, 22 Drawing Sheets

(51) Int. Cl.
    *H04W 72/30*     (2023.01)
    *H04W 76/40*     (2018.01)

(56)            References Cited

U.S. PATENT DOCUMENTS

| | | | | |
|---|---|---|---|---|
| 2019/0159072 A1* | 5/2019 | Zhu | | H04W 28/24 |
| 2021/0068003 A1* | 3/2021 | Kadiri | | H04L 1/1812 |
| 2021/0274407 A1* | 9/2021 | Wu | | H04W 36/026 |
| 2022/0053362 A1* | 2/2022 | Sebire | | H04W 28/0252 |
| 2022/0295236 A1* | 9/2022 | Baek | | H04W 76/12 |
| 2022/0312196 A1* | 9/2022 | Guo | | H04W 12/037 |
| 2023/0180349 A1* | 6/2023 | Zhu | | H04W 4/06 |
| | | | | 370/312 |

OTHER PUBLICATIONS

Mills et al., "Network Time Protocol Version 4: Protocol and Algorithms Specification", Internet Engineering Task Force (IETF), Request for Comments: 5905, Jun. 2010, 90 pages.

Schulzrinne et al., "RTP: A Transport Protocol for Real-Time Applications", The Internet Society, Network Working Group, Request for Comments: 3550, Jul. 2003, 72 pages.

"3rd Generation Partnership Project; Technical Specification Group Core Network and Terminals; General Packet Radio System (GPRS) Tunnelling Protocol User Plane (GTPv1-U), (Release 16)", 3GPP TS 29.281 V16.0.0, Dec. 2019, 33 pages.

"3rd Generation Partnership Project; Technical Specification Group Core Network and Terminals; General Packet Radio Service (GPRS); Gprs Tunnelling Protocol (GTP) across the Gn and Gp interface, (Release 16)", 3GPP TS 29.060 V16.0.0, Mar. 2020, 195 pages.

"3rd Generation Partnership Project; Technical Specification Group Services and System Aspects; Northbound Application Programming Interface (API) for Multimedia Broadcast/Multicast Service (MBMS) at the xMB reference point, (Release 16)", 3GPP TS 26.348 V16.3.0, Mar. 2020, 49 pages.

"3rd Generation Partnership Project; Technical Specification Group Radio Access Network; NG-RAN; PDU Session User Plane Protocol; (Release 16)", 3GPP TS 38.415 V16.0.0, Mar. 2020, 14 pages.

"3rd Generation Partnership Project (3GPP), Technical Specification Group Radio Access Network, Evolved Universal Terrestrial Radio Access (E-UTRA), Radio Resource Control (RRC), Protocol specification (Release 15)", 3GPP TS 36.331 V15.11.0, Sep. 2020, 977 pages.

"3rd Generation Partnership Project; Technical Specification Group Services and System Aspects; Multimedia Broadcast/Multicast Service (MBMS) Architecture and functional description, (Release 16)", 3GPP TS 23.246, v16.1.0, Sep. 2019, 77 pages.

\* cited by examiner

Bits

| Octets | 8 | 7 | 6 | 5 | 4 | 3 | 2 | 1 |
|---|---|---|---|---|---|---|---|---|
| 1 | Version | | | PT | (*) | E | S | PN |
| 2 | Message Type | | | | | | | |
| 3 | Length (1st Octet) | | | | | | | |
| 4 | Length (2st Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)[1) 4)] | | | | | | | |
| 10 | Sequence Number (2nd Octet)[1) 4)] | | | | | | | |
| 11 | N-PDU Number[2) 4)] | | | | | | | |
| 12 | Next Extension Header Type[3) 4)] | | | | | | | |

FIG. 6

| Octets 1 | Extension Header Length |
|---|---|
| 2 - m | Extension Header Content |
| m+1 | Next Extension Header Type (Note) |

FIG. 7

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | QMP | SNP | Spare | | 1 |
| PPP | RQI | QoS Flow Identifier | | | | | | 1 |
| PPI | | Spare | | | | | | 0 or 1 |
| DL Sending Time Stamp | | | | | | | | 0 or 8 |
| DL QFI Sequence Number | | | | | | | | 0 or 3 |
| Padding | | | | | | | | 0-3 |

FIG. 8

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | QMP | SNP | CFP | Spare | 1 |
| PPP | RQI | QoS Flow Identifier | | | | | | 1 |
| PPI | | CFI | | | | | | 0 or 1 |
| DL Sending Time Stamp | | | | | | | | 0 or 8 |
| DL QFI Sequence Number | | | | | | | | 0 or 3 |
| Padding | | | | | | | | 0-3 |

FIG. 9

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | QMP | SNP | CFP | Spare | 1 |
| PPP | RQI | QoS Flow Identifier | | | | | | 1 |
| PPI | | Spare | | | | | | 0 or 1 |
| DL Sending Time Stamp | | | | | | | | 0 or 8 |
| DL QFI Sequence Number | | | | | | | | 0 or 3 |
| CFI | | | | | | | | 0 to n |
| Padding | | | | | | | | 0-3 |

FIG. 10

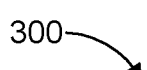

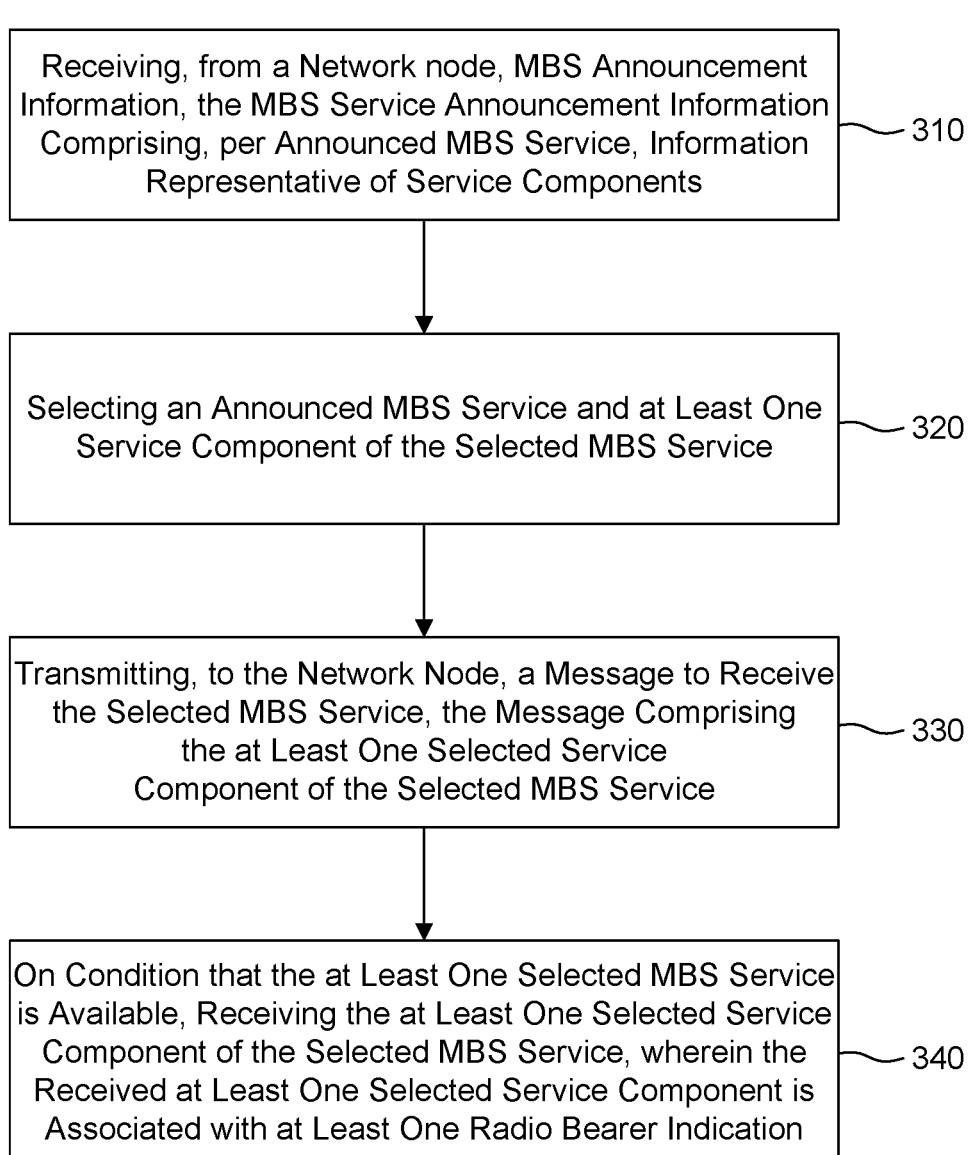

Receiving, from a Network node, MBS Announcement Information, the MBS Service Announcement Information Comprising, per Announced MBS Service, Information Representative of Service Components — 310

Selecting an Announced MBS Service and at Least One Service Component of the Selected MBS Service — 320

Transmitting, to the Network Node, a Message to Receive the Selected MBS Service, the Message Comprising the at Least One Selected Service Component of the Selected MBS Service — 330

On Condition that the at Least One Selected MBS Service is Available, Receiving the at Least One Selected Service Component of the Selected MBS Service, wherein the Received at Least One Selected Service Component is Associated with at Least One Radio Bearer Indication — 340

FIG. 18

METHODS, APPARATUSES AND SYSTEMS DIRECTED TO DYNAMIC USE OF MULTICAST RADIO RESOURCES

CROSS REFERENCE TO RELATED APPLICATIONS

This application is a U.S. National Stage Application under 35 U.S.C. § 371 of International Patent Application No. PCT/EP2022/055729, filed Mar. 7, 2022, which is incorporated herein by reference in its entirety.

This application claims priority to European Application No. 21305297.0, filed Mar. 11, 2021, which is incorporated herein by reference in its entirety.

BACKGROUND

The present disclosure relates to network communications, including, but not exclusively, to methods, apparatuses, systems, etc. directed to dynamic use of multicast radio resources.

SUMMARY

Methods, apparatuses, systems, etc., directed to dynamic use of multicast radio resources are disclosed herein. In an embodiment, a method, implemented by a wireless transmit/receive unit (WTRU), for receiving a multicast and broadcast service (MBS), e.g., from a radio access network (RAN) node, may comprise: receiving MBS service announcement information (e.g., service announcement data), the MBS service announcement information comprising, per announced MBS service, (e.g., a list of) information representative of service components; selecting an announced MBS service and at least one service component of the selected MBS service; transmitting a message to receive (e.g., to request) the selected MBS service, the message comprising (e.g., a list of) selected service component(s) of the selected MBS service; and under condition that the selected MBS service is available, receiving the selected service component(s) of the selected MBS service.

Methods, apparatuses, systems, etc., directed to dynamic use of multicast radio resources are disclosed herein. In an embodiment, a method, implemented by a wireless transmit/receive unit (WTRU), for receiving service components of a multicast and broadcast service (MBS), split in multicast and unicast service transmission, from a radio access network (RAN), node, the method comprising: transmitting, to a RAN node, requested (e.g., list of) service components of a MBS; receiving, from the RAN node, the requested (e.g., list of the) service components split into unicast and multicast (e.g. list of the) service components associated with radio bearers' indications; establishing the radio bearers with the RAN node for unicast and multicast transmission of the service components flow; receiving, from the RAN node, the service components flow split into unicast and multicast wireless transmission.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 6 is a diagram illustrating an example of an outline of a general packet radio service tunneling protocol (GTP) header according to an embodiment;

FIG. 7. is a diagram illustrating an example of an outline of an extension header format of the GTP header of FIG. 6;

FIG. 8. is a diagram illustrating an example of a downlink (DL) protocol data unit (PDU) session information format according to an embodiment;

FIG. 9 is a diagram illustrating an example of a DL PDU session information format for component flows management according to an embodiment;

FIG. 10 is a diagram illustrating an example of a DL PDU session information format for component flows management according to another embodiment;

FIG. 18 is a flow chart illustrating an example of a method implemented by a WTRU, for receiving service components of a Multicast and Broadcast Service.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
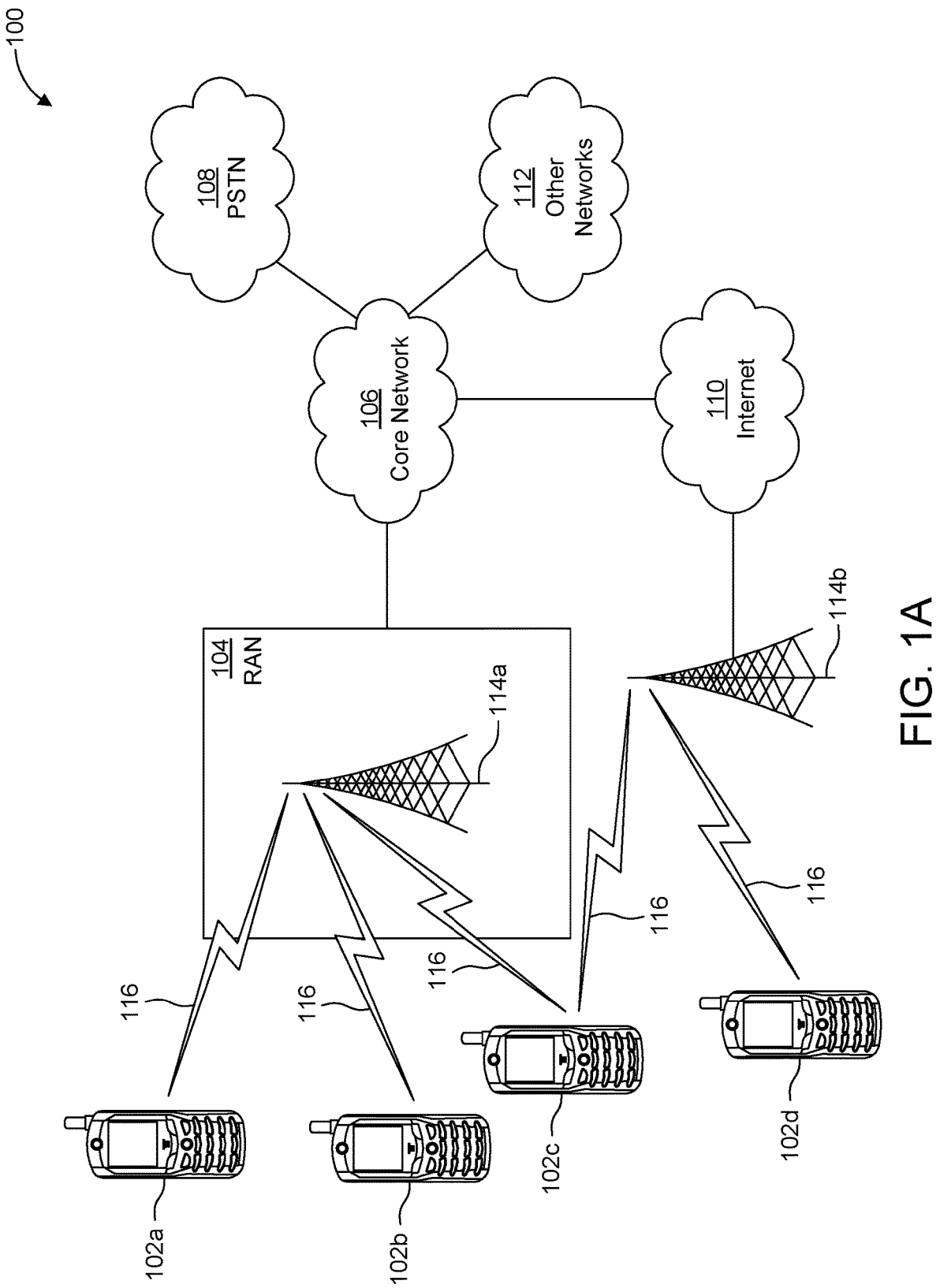
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a Radio Access Network (RAN) 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, an NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed UL packet access (HSUPA).

In an embodiment, the base station 114a and the WTRUs 102a, 102b, 102c may implement a radio technology such as evolved UMTS terrestrial radio access (E-UTRA), which may establish the air interface 116 using long term evolution (LTE) and/or LTE-advanced (LTE-A) and/or LTE-advanced pro (LTE-A Pro).

In an embodiment, the base station 114a and the WTRUs 102a, 102b, 102c may implement a radio technology such as NR radio access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., wireless fidelity (WiFi), IEEE 802.16 (i.e., worldwide interoperability for microwave access (WiMAX)), CDMA2000, CDMA2000 1×, CDMA2000 EV-DO, interim standard 2000 (IS-2000), interim standard 95 (IS-95), interim standard 856 (IS-856), global system for mobile communications (GSM), enhanced data rates for GSM evolution (EDGE), GSM EDGE (GERAN), and the like.

The base station 114b in FIG. 1A may be a wireless router, home node B, home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
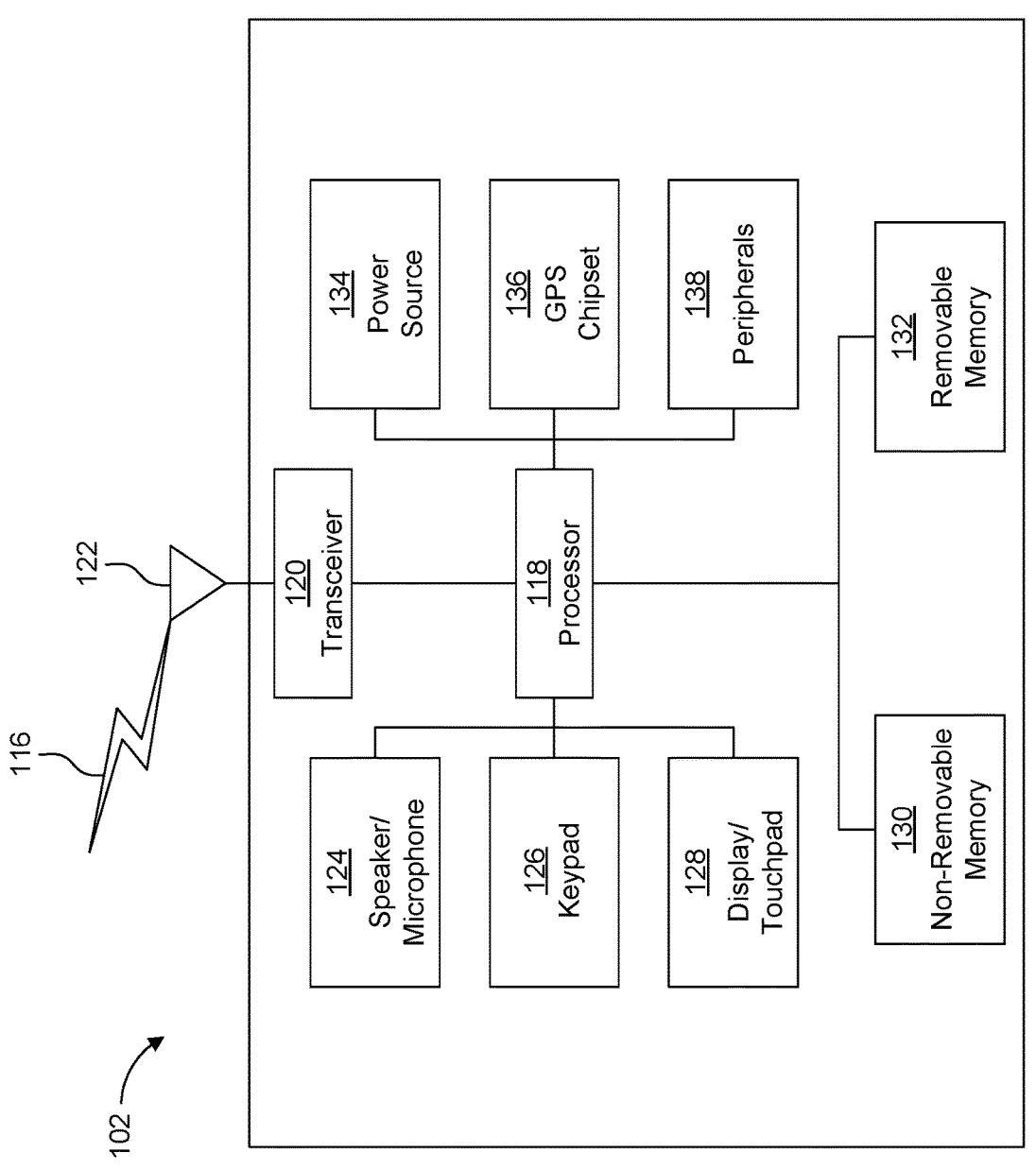
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, application specific integrated circuits (ASICs), field programmable gate arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
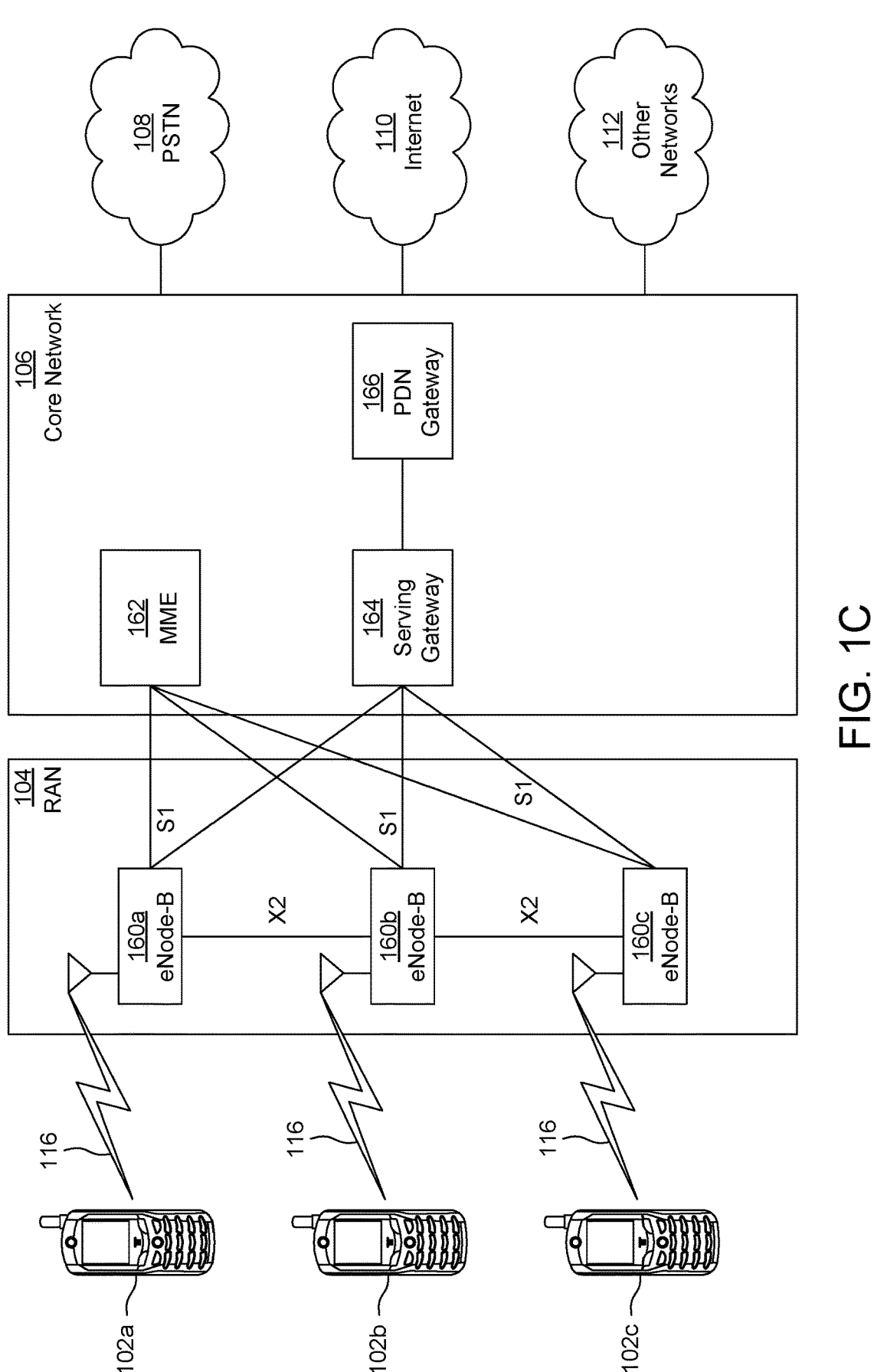
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 megahertz (MHz) wide bandwidth) or a dynamically set width via signaling. The primary channel may be the operating channel of the BSS and may be used by the STAs to establish a connection with the AP. In certain representative embodiments, carrier sense multiple access with collision avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 gigahertz (GHz) modes of operation are supported by 802.11af and 802.11ah. The channel operating bandwidths, and carriers, are reduced in 802.11af and 802.11ah relative to those used in 802.11n, and 802.11ac. 802.11af supports 5 megahertz (MHz), 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
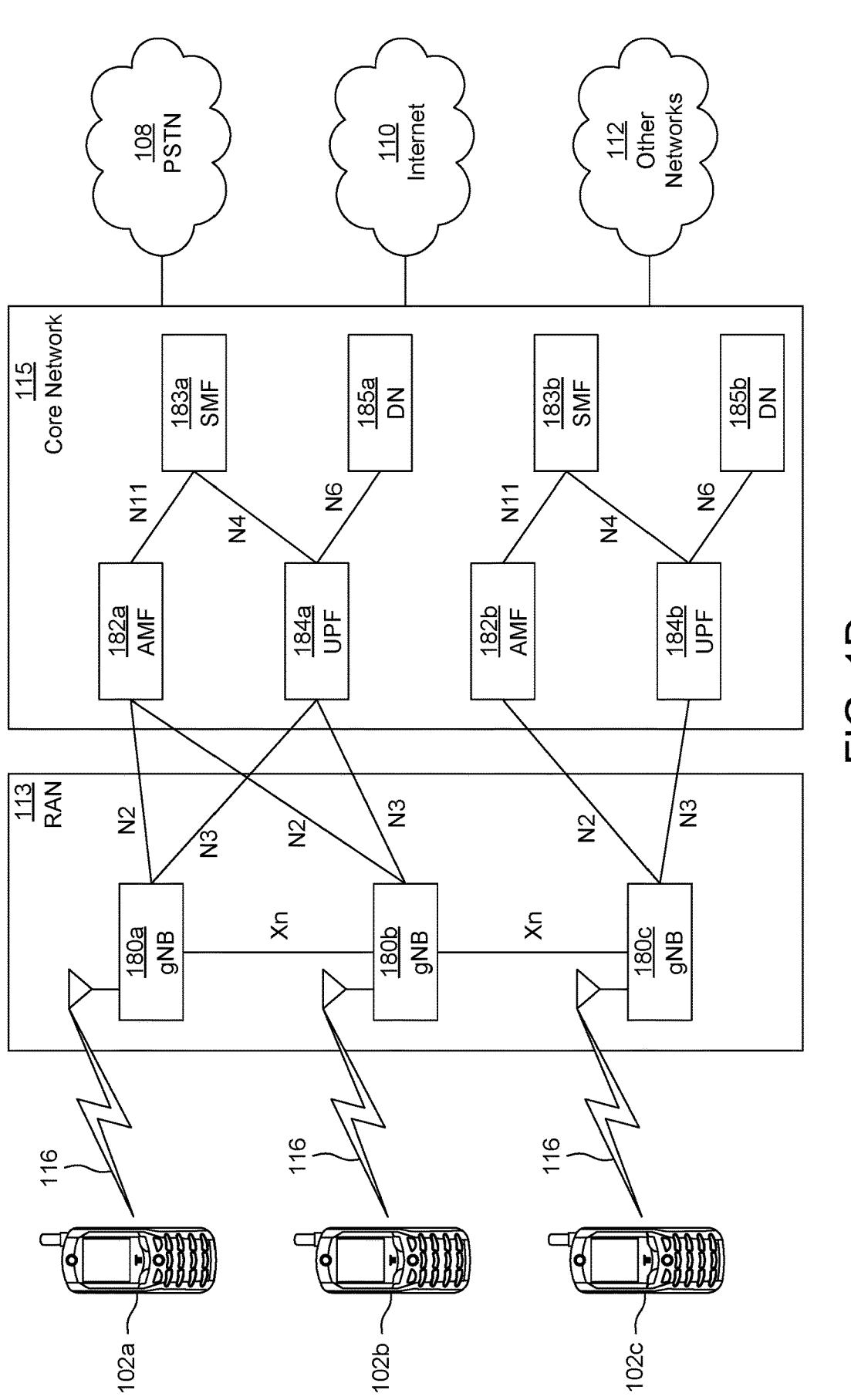
FIG. 1D is a system diagram illustrating a further example of a RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement coordinated multi-point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane function (UPF) 184a, 184b, routing of control plane information towards access control and mobility management function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one session management function (SMF) 183a, 183b, and possibly a data network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Mobile Communication Example

Mobile communications are in continuous evolution and are already at doorsteps of its fifth incarnation, which is called $5^{th}$ generation, and may be referred to herein as any of 5G, NR, collectively NR. The $3^{rd}$ Generation Partnership Project (3GPP) has standardized a new 5G system architecture and radio access technology (5G New Radio—NR) focusing on unicast connectivity.

For example, in a mobile communication system, in scenarios where a plurality of WTRUs may be consuming the same data, such as e.g., any of popular media content and software updates, multicast/broadcast schemes may allow increased capacity gains, for example, ensuring a cost-effective and high-quality delivery mechanism.

The multicast QoS flow may be a (e.g., the finest) granularity of QoS differentiation in a multicast and broadcast service (MBS) session. A QoS flow identifier (QFI) may be used to identify a multicast QoS flow in the communication system. MBS traffic with the same QFI within an MBS session may receive the same traffic forwarding treatment. The QFI, that may be carried in the encapsulation header of the tunnel in a 5G Core Network (CN), may improve (e.g., facilitate) the traffic shaping as well as the mapping to radio bearers. QFI data packets marking may not allow to differentiate any component flow (e.g., each component flow).

The term "component(s)" may be used herein to refer to the data streams of a full content, which may be transported as separate flows of data, and that a WTRU may (e.g., individually) select for presentation to a user interface. As an example, different language audio tracks may be available, from which a given end user will listen (e.g., only listen) to one.

As a non-limiting example, a multimedia service provided as 5G MBS where the MBS session may comprise a video track and a set of audio tracks corresponding to different languages. An audio language (e.g., a preferred audio language) may be selected in the WTRU, for example via a user interface.

According to the 3GPP $4^{th}$ generation (4G) mobile networks, other audio tracks may be received by the WTRU, and may be ignored locally. The other audio tracks may use some bandwidth in the network. In a case where a plurality of WTRUs are receiving the same session through a shared radio channel, it may be the case that some audio tracks are used by nobody in the area deserved by a base station (e.g. a single base station). For example, the local language may be usually chosen by (e.g., most) user interfaces (e.g., by most user interfaces). A WTRU may be able to any of select and leave an (e.g., entire) session. For example, the QoS flows, which may be identified by the 5G RAN based on the QFI indication in the general packet radio service tunneling protocol (GTP), may not correspond to audio/video tracks. For example, any components (e.g., all components) with the same type of data may be included (e.g., gathered) in the same QoS flow. For instance, there may be one QoS profile for the video, and a common QoS profile for any (e.g., all) audio tracks (e.g., together).

For example, energy consumption and electromagnetic pollution may (e.g., largely) depend on the traffic load. Limiting the data to be transmitted may allow to develop a "green communication system". According to an embodiment, the NR may allow the WTRU to signal what it may receive and to maintain (e.g., each) component stream differentiation e.g., in addition to the QoS differentiation supported by the QFI data packets marking. Such a flow granularity may allow to deliver any components (e.g., only components) which may be consumed by the WTRUs.

The 5G network may allow to increase the number of devices that may be used by the consumer at faster rates than ever before. For example, the mobile networks may have detrimental consequences for the environment, as for example, the increase of energy consumption and the usage of not renewable materials for device manufacturing. By enabling more people to work or access entertainment remotely and avoid driving and flying for business, 5G may also save energy and reduce emissions from vehicles and airplanes.

As an example, any of a broadcast and a multicast service may allow to deliver the same specific content data (e.g., simultaneously) to any of all WTRUs and a set of WTRUs (e.g., dedicated set of WTRUs) in a geographical area. Any of a multicast and a broadcast service (MBS), as defined in 3GPP terminology, may be a set of any number of components that may be delivered in a single (e.g., unique) session. Such a session may be transported in a multicast way within a core network (CN) up to a RAN. Depending on the number of WTRUs (e.g., interested WTRUs) in a cell, the content may be delivered over the air in any of a point-to-point (PTP) (e.g., unicast), and a point-to-multipoint (PTM) (e.g., multicast), way. In case of a service having optional components, as, for example, a video service provided in different languages, the MBS session may transport different flows: a video and the different languages audio tracks. A WTRU may consume, one audio track at a time and, in certain areas, it may be useless to transmit (e.g., deliver) all the audio tracks. For example, transmitting over the air any components (e.g., only components) of an MBS session which may be consumed by the WTRUs may allow to prevent a waste of wireless resource and energy. Embodiments described herein may include methods for:

Identifying and isolating flows of the different components of an MBS service;

Collecting the identity of components requested by the WTRUs and informing the RANs accordingly;

Efficient filtering of component before wireless transmission in the RAN;

Maintaining the flows (e.g. list of flows) to be delivered within a cell.

Example of 5G Entities for MBS Service

Figure 2:
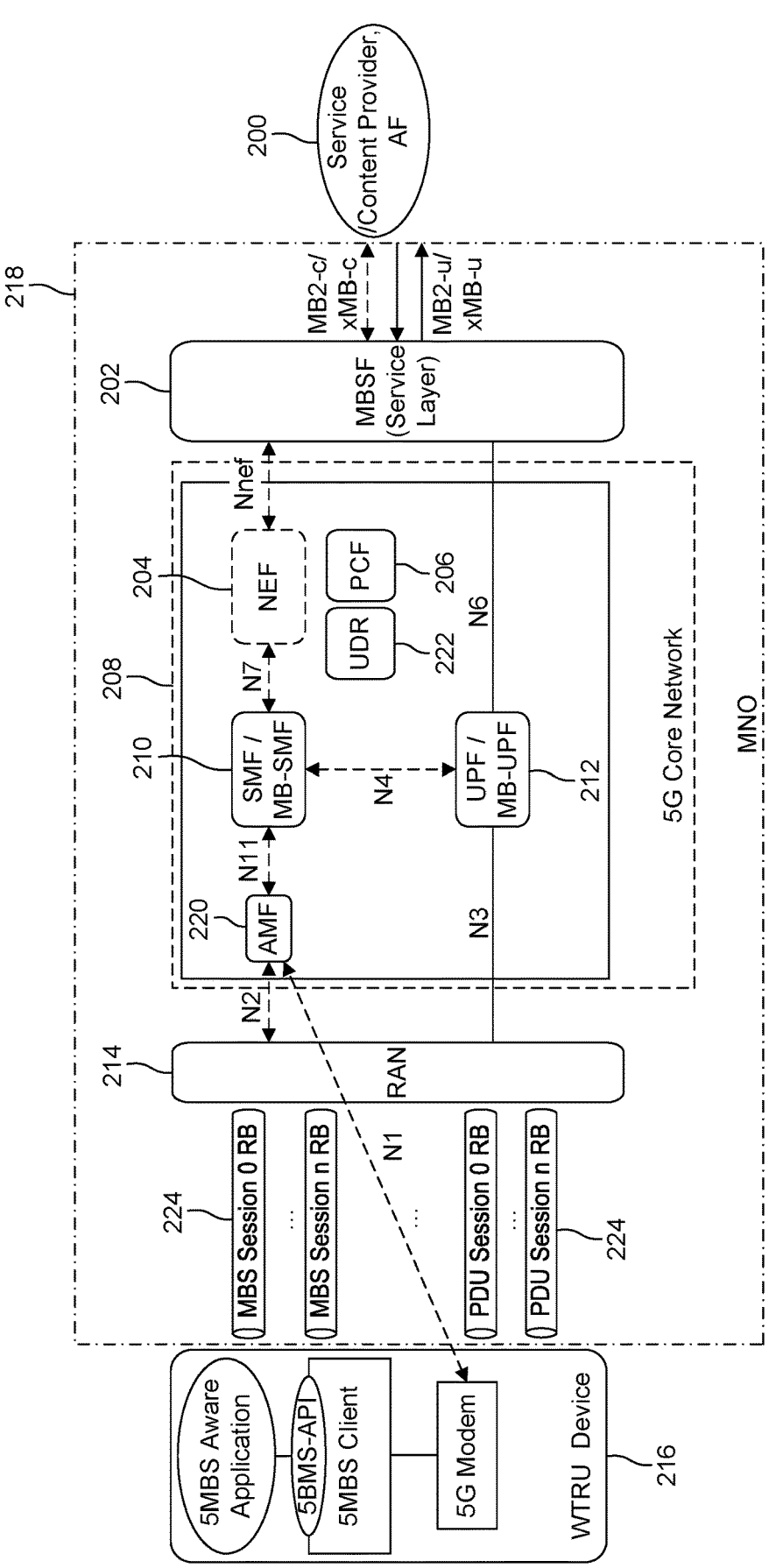
FIG. 2 is a block diagram illustrating an example of 5G entities according to an embodiment.

FIG. 2 is a block diagram illustrating an example of one embodiment that may depict a 5G multicast-broadcast (5MBS) Architecture and the relevant entities that may be involved in a 5G MBS service.

Service and Content Provider:

A content provider (CP) 200, may be the owner of a multimedia content an end user may be interested in. A reference point between the content provider 200 and a service layer (MBSF) 202 may be referred to herein as the MB/xMB interface according to the 3GPP terminology. Using this reference point, the content provider 200 may invoke procedures supported by the service layer (MBSF) 202 to setup and manage any of MBS service and MBS session. One service layer agreement (SLA) may be signed between the operator and the content provider 200.

An application function (AF), part of the service and content provider 200, may include the following functionalities: access to a network exposure function (NEF) 204, request to any of a policy control function (PCF) 206 and the NEF 204 to create policies for multicast flows within the MBS session context, influence on traffic routing, interact with the policy framework.

Service Layer 202 (MBSF):

A MBSF 202 may be an optional entity of a mobile network operator (MNO) 218 which may include the multicast and broadcast function in the application function (AF), part of the content provider 200, to setup and manage MBS sessions and provision user data.

5G Core Network 208 Entities:

The NEF 204 may include any of the following functionalities: exposure of 5G MBS service, negotiation of any of 5G MBS service AF and MBSF 202 including QoS, and 5G MBS service area.

Any of the session management function (SMF) 210 and the multicast/broadcast session management function (MB-SMF), may include any of the following functionalities: control of MBS transport based on received MBS policies from the PCF 206, configuration of any of UPF 212 and multicast/broadcast UPF (MB-UPF) for MBS flows both for any of PTP and PTM transfer, configuration of a RAN 214 for MBS flows and QoS information, and session configuration at a WTRU 216 for MBS flows.

An access control and mobility management function (AMF) 220 may include any of the following functionalities:

registration management, connection management, reachability management, and mobility management.

The UPF 212 may include any of the following functionalities: packet filtering of QoS flows, and delivery of MBS flows to the RAN 214 via any of dedicated and shared tunneling; receiving 5G MBS flow configuration from SMF 210, detecting any of internet group management protocol (IGMP) and multicast listener discovery (MLD) packets and notifying to SMF 210; and receiving both unicast and MBS flows.

The PCF 206 may include any of the following functionalities: support unified policy framework to govern network behavior; provide policy rules to control plane function(s) to enforce them; and access subscription information (e.g., relevant) for policy decisions in a unified data repository (UDR) 222.

The UDR 222 may include any of the following functionalities: storage and retrieval of subscription data by a unified data management (UDM); storage and retrieval of policy data by the PCF 206; storage and retrieval of structured data for exposure; application data (e.g., including any of packet flow descriptions (PFDs) for application detection, AF request information for a plurality of WTRUs, 5G LAN group information for 5G LAN management); storage and retrieval of network function (NF) group identity (ID) corresponding to subscriber identifier (e.g. IP multimedia private identity (IMPI), IP multimedia public identity (IMPU), subscription permanent identifier (SUPI)).

MB-SMF, MB-UPF and MBSF 202 may be functional components, which may be standalone or co-located with existing network functions.

RAN 214

The RAN 214 may refer to the access network for 5G. RAN 214 may provide any of NR and E-UTRA radio access that may connect to any of 4G and 5G core network and insure interworking between both.

Radio Bearer (RB)

A PDU session radio bearer 224 may refer to the radio resources that may be allocated (e.g., reserved, booked) to transmit unicast (e.g., user) data over the air. These resources may be reserved for a (e.g., single) a WTRU 216 (e.g., a single WTRU).

A MBS session RB 226 may refer to the radio resources that may be allocated (e.g., reserved, booked) to transmit multicast data over the air (e.g., user data). These resources may be allocated (e.g., reserved, booked) for a group of WTRUs. Allocating (e.g., reserving, booking) resources for a group of WTRUs may allow to optimize the resources because the same user data may be transmitted simultaneously to several WTRUs.

Logical Radio Channels

Broadcast control channel (BCCH) may be the broadcast logical channel to transmit common control information to all the WTRUs.

Multicast control channel (MCCH) and multicast traffic channel (MTCH) may be separate channels (e.g., totally separate channel) for 5MBS. MCCH may be for controlling information and MTCH may be for data transmission. There may be one MCCH channel per 5MBS area and any number of MTCH channels per service.

Service announcement channel (SACH) may be the logical channel used to transmit (e.g., distribute) to WTRU 216 service announcement information indicating which services may be available and to get the information to access them.

WTRU 216

The WTRU 216 may refer to an authenticated WTRU 216 with subscription authorized to use the mobile network for bidirectional communication. The WTRU 216 may be any of user equipment in wireless communication with the mobile network. The WTRU 216 may be any of devices providing content, such as voice, data, video, messaging, broadcast, etc., to multiple wireless users. The WTRU 216 may be a gateway (e.g., wireless box) providing content, such as voice, data, video, messaging, broadcast, etc., to any of devices in communication with the gateway. The gateway may communicate with the devices using any of delivery/transport protocol (e.g., MPEG Dash), the gateway being in wireless communication with the mobile network. The gateway may receive, from the core network, a content limited, as much as possible, to the content (e.g., really) consumed by the devices (e.g., selected by component flows.)

Example of Joining an MBS Session

The service and content provider 200 may include a multicast service in the area where a group of WTRUs may be located and may have established a multicast session for service #1 towards a public land mobile network (PLMN) for different RAN nodes.

Figure 3:
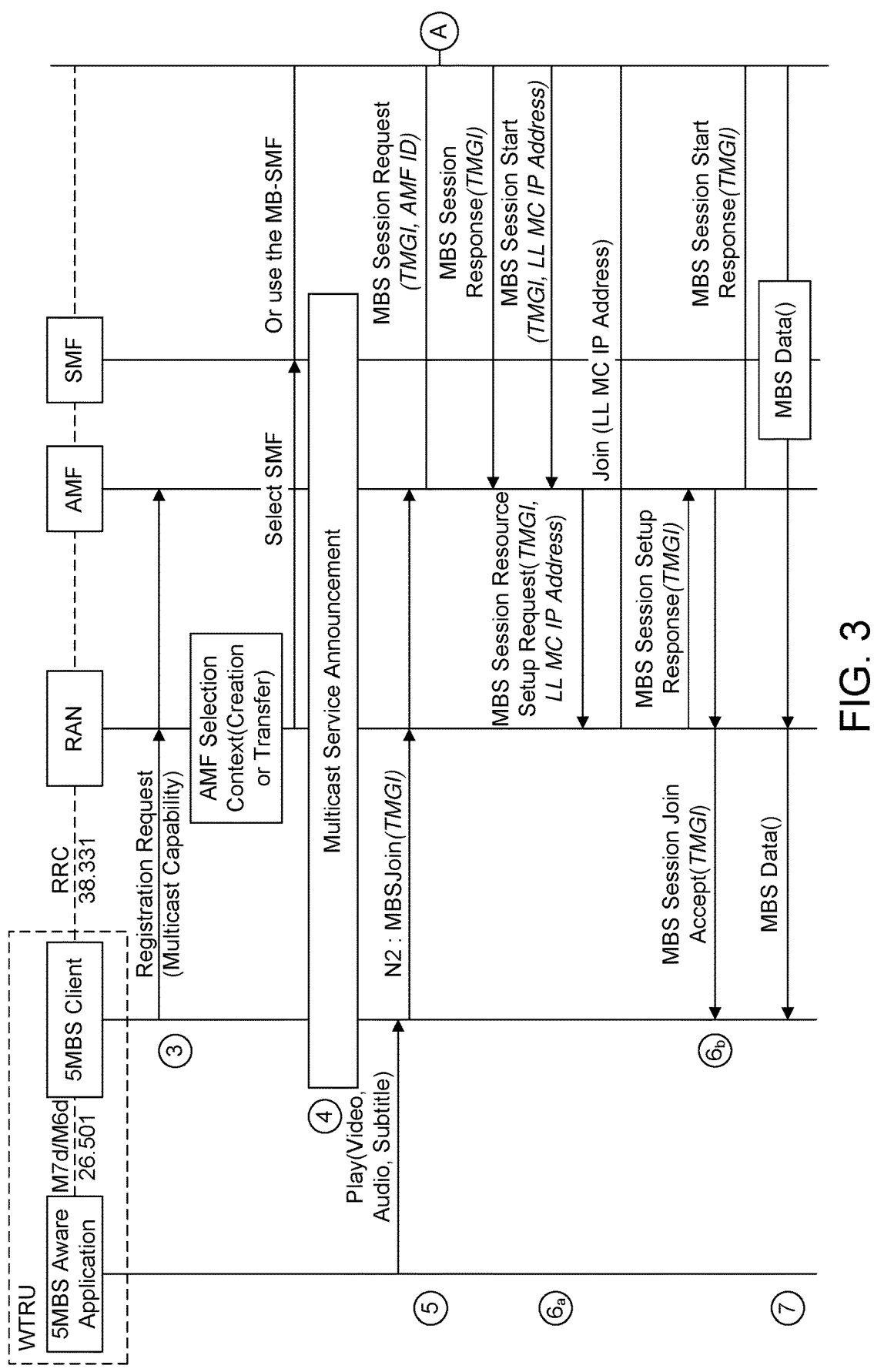
FIG. 3 is a sequence diagram illustrating an example of an MBS service/session joining by a WTRU through control plane according to an embodiment.
Figure 3:
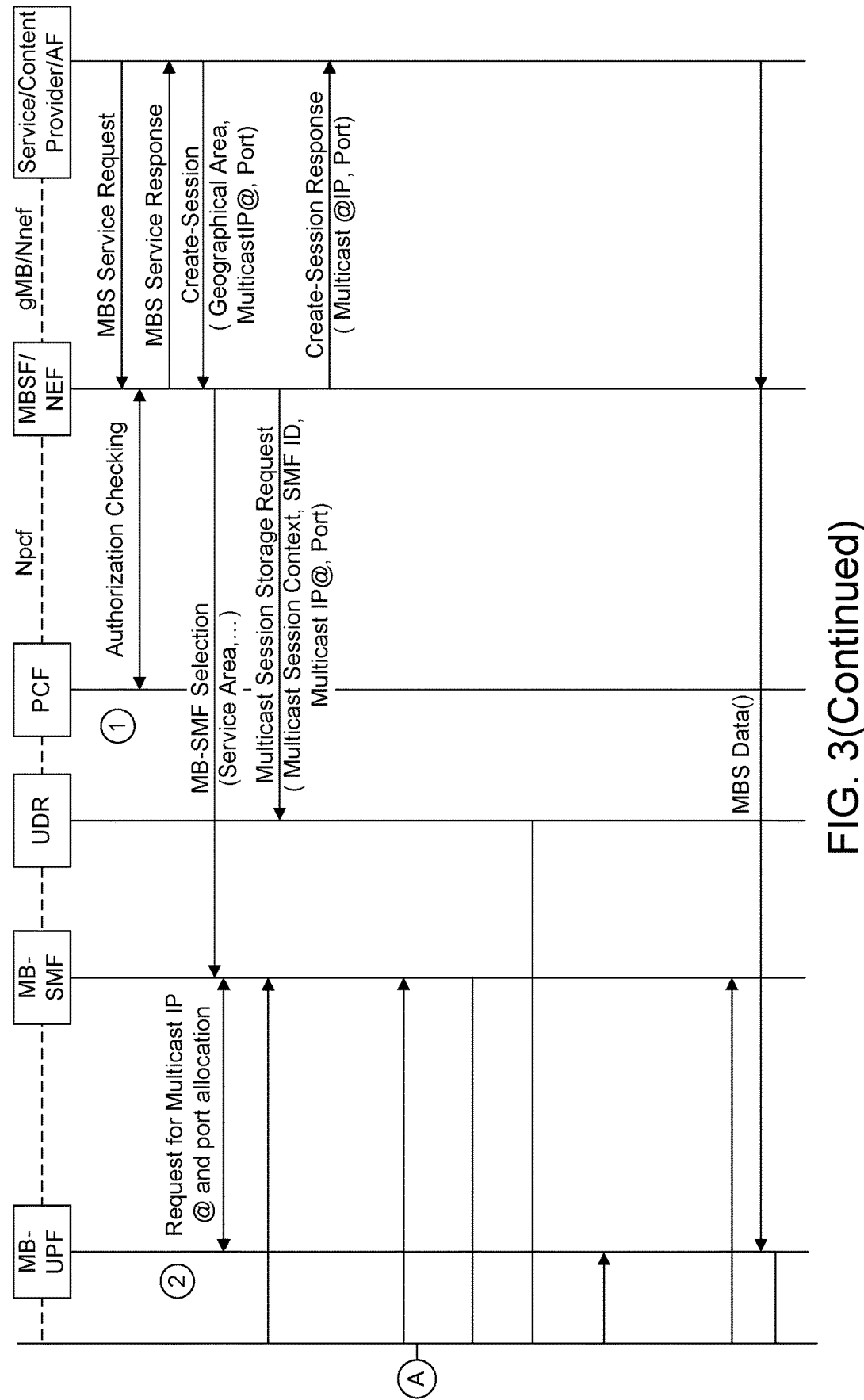
Figure 4:
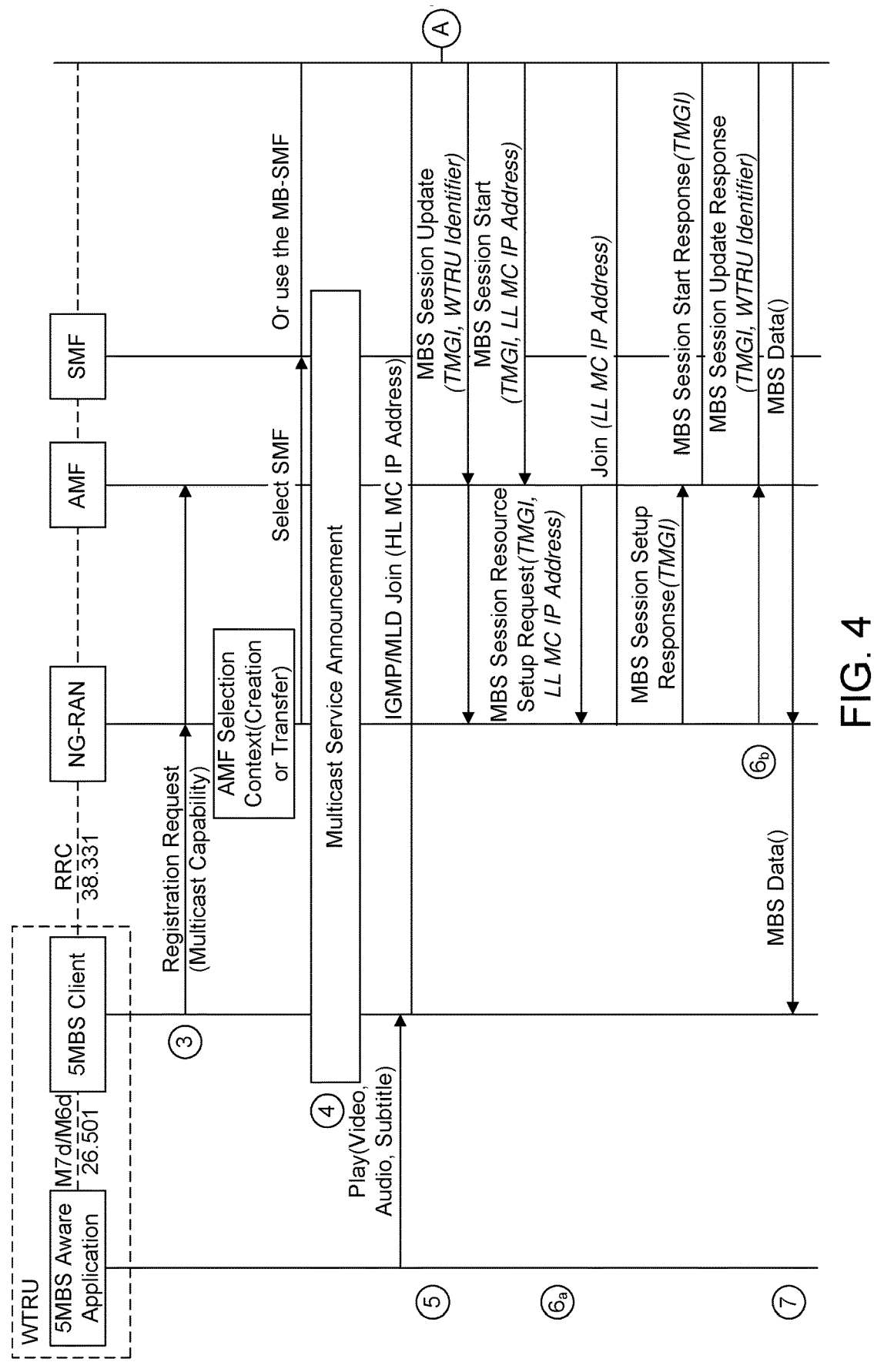
FIG. 4 is a sequence diagram illustrating an example of an MBS service/session joining by a WTRU through user plane according to an embodiment.
Figure 4:
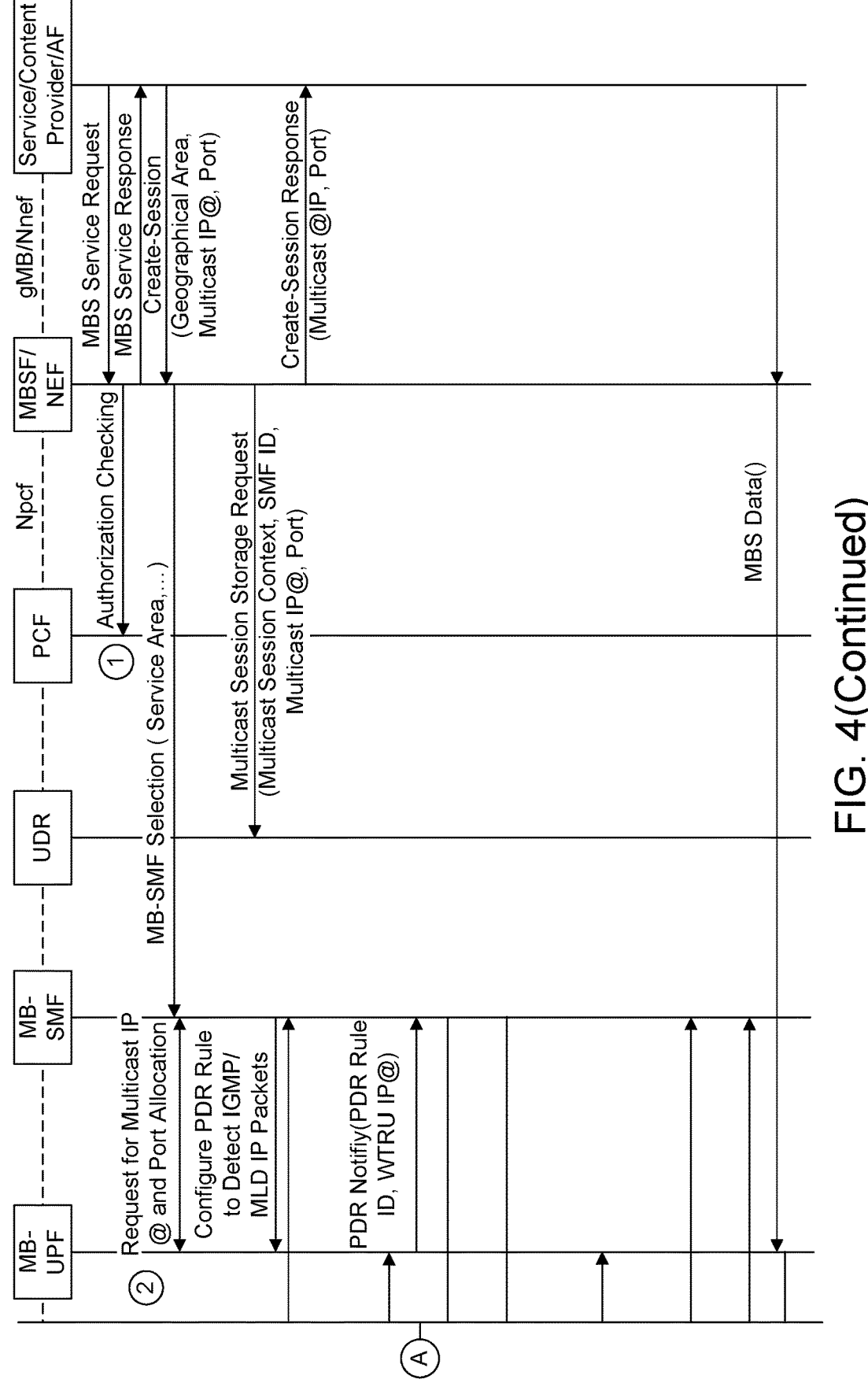

FIG. 3 and FIG. 4 are two examples of sequence diagrams to create and announce an MBS session (temporary mobile group identity #1 'TMGI #1') by the service provider 200 and a registration of the WTRU 216 to the PLMN. A WTRU 216 (e.g., a new WTRU) may join the MBS session based on NAS protocol in any of the control plane and, the internet group management protocol and the multicast listener discovery (IGMP/MLD) in the user plane (UP).

FIG. 3 is an example of a procedure wherein the NAS protocol in the control plane may be used. FIG. 3 depicts the following steps for joining an MBS service/session by control plane.

At step 3.1, e.g., based on SLA agreement, any of the service and content provider 200 and AF may communicate with the MNO 218 through an application program interface (API) towards any of the MBSF 202 and NEF 204 functions to create and get back a resource identifier of the service. The service and content provider 200 may get and may update service properties (e.g., TMGI, QoS, session duration).

At step 3.2, any of the service, the content provider 200 and the AF may create and may configure an MBS session that may be identified by a temporary mobile group identity (TMGI) that may be allocated by any of MBSF 202 and NEF 204. The MB-SMF may be selected by these functions for the targeted geographical area. The MB-UPF may be also selected. A high layer multicast (HL MC) IP address and port may be provided by the service and content provider 200 and, in that case, the selected MB-UPF may not allocate them. All the MBS session information (MBSF ID, HL MC IP address, port . . . ) may be stored in UDR, for example, for future use. The destination multicast IP address used by the content provider 200 and used by the WTRU 216 to consume the service may be referred to herein as high layer multicast (HL MC) address. The service and content provider 200 may be acknowledged (not shown).

At step 3.3, the WTRU 216 may register to the PLMN with multicast support indication over interface (e.g., N1) and using NAS messages. Appropriate AMF 220 and any of SMF 210 and MB-SMF may be selected. WTRU 216 may be configured to receive service/session announcements.

At step 3.4, the WTRU may receive an information indicating the MBS session may be transmitted (e.g., the MBS service session may be announced). The WTRU 216 may include the service within its service list with HL MC IP address. An information indicating the MBS service session announcement may be transmitted (e.g., notified) to any of the TMGI and the 5MBS aware application.

At step 3.5, the 5MBS aware application may request to play the service. The 5MBS WTRU may send (e.g., through N1 interface) a message: join request to AMF. The AMF 220 may send (e.g., through N11 interface) a message: MBS session request message to MB-SMF including the WTRU 216 identifier and may wait for a response message (e.g., through N11 interface): MBS session response message indicating that the WTRU 216 may be authorized to join this session. In a case where an MBS session response message is received, the application may update or may create its WTRU MBS context (e.g., HL MC IP address, UDP port number). In a case where the WTRU 216 is not the first device joining, the procedure for joining an MBS service session by the control plane session may process (e.g., directly) the step 3.6b.

At step 3.6a, the WTRU 216 may be the first WTRU connecting to the MBS session. For example, MB-SMF may send (e.g., through a N11 interface) a message: MB session start message to AMF 220. AMF 220 may send (e.g., through a N2 interface) a message: MBS session resource setup request message to RAN 214. The destination multicast IP address used for transport multicast tunneling may be referred to herein low layer multicast (LL MC) address.

At step 3.6b, AMF 220 may accept the join by sending the N2: MBS join accept message to the WTRU 216. For example, after the resources may have been allocated and the RAN 214 may have joined the low layer multicast (LL MC) IP address group, AMF may send (e.g., through a N11 interface) a message: MBS session start response to MB-SMF e.g., for acknowledgement.

At step 3.7: the WTRU 216 may receive information (e.g., data) from the MBS.

FIG. 4 is an example of a procedure wherein the IGMP/MLD in the user plane, for joining an MBS service session, may be used. FIG. 4 depicts the following steps for joining an MBS service session by user plane (UP).

At step 4.1, e.g., based on SLA agreement, any of the service and content provider 200 and AF may communicate with the MNO 218 through the API towards any of the MBSF 202 and NEF functions to create and get back a resource identifier of the service. Besides, the service and content provider 200 may get and may update service properties (e.g., TMGI, QoS, session duration).

At step 4.2, any of the service and content provider 200 and AF may create and may configure an MBS session that may be identified by a temporary mobile group identity (TMGI) that may be allocated by any of MBSF and NEF. The MB-SMF may be selected by these functions for the targeted geographical area. The MB-UPF may also be selected. The HL MC IP address and port may be provided by the service and content provider 200. The selected MB-UPF may not allocate them. MB-SMF may configure (e.g., install) the dedicated packet data rule (PDR) in MB-UPF in order to be notified when IGMP/MLD messages may be received for the HL MC IP address group. For example, (e.g., all) the MBS session information (any of MBSF ID, HL MC IP address, port . . . ) may be stored in UDR e.g., for future use. The service and content provider 200 may be acknowledged (not shown).

At step 4.3, the WTRU 216 may transmit a NAS message for registering to the PLMN with multicast support indication (e.g., multicast capability) over an interface (e.g., N1 interface). An (e.g., appropriate) AMF 220 and any of SMF 210 and MB-SMF may be selected. WTRU 216 may be configured to (e.g., be ready to) receive service session announcements.

At step 4.4, the WTRU may receive an information indicating the MBS session may be transmitted (e.g., the MBS service session may be announced). The WTRU 216 may include the service within its service list with HL MC IP address. An information indicating the MBS service session announcement may be transmitted (e.g., notified) to any of the TMGI and the 5MBS aware application.

At step 4.5, the 5MBS aware application may request to play the service. The 5MBS WTRU may perform an IGMP/ MLD join with the HL MC IP address. The HL MC IP address may trigger the MB-UPF (PDR matches). An information from the MB-UPF may be transmitted (notified) to MB-SMF including PDR Rule ID and the WTRU IP address parameters. MB-SMF may retrieve the MBS session TMGI and the WTRU identifier and may perform an MBS session update to AMF 220 and RAN 214 if the WTRU 216 is authorized to join the MBS session. If the WTRU 216 is not the first WTRU joining the MBS session, the procedure for joining an MBS service session by user plane may process (e.g., directly) the step 4.6*b*.

At step 4.6*a*, the WTRU 216 may be the first connecting to the MBS Session. For example, MB-SMF may send (e.g., through N11 interface) a message: MB session start message to AMF 220. AMF 220 may send (e.g., through a N2 interface) a message: MBS session resource setup request message to RAN 214. After the resources may have been allocated and the RAN 214 may have joined the LL MC IP address group, AMF 220 may send (e.g., through a N11 interface) a message: MBS session start response to MB-SMF e.g., for acknowledgement.

At step 4.6*b*: RAN 214 and AMF 220 may accept the MBS session update by sending the MBS Session Update Response to MB-SMF.

At step 4.7: the WTRU 216 may receive information (e.g., data) from the MBS.

Example of MBS User Plane Protocol Stack

Figure 5:
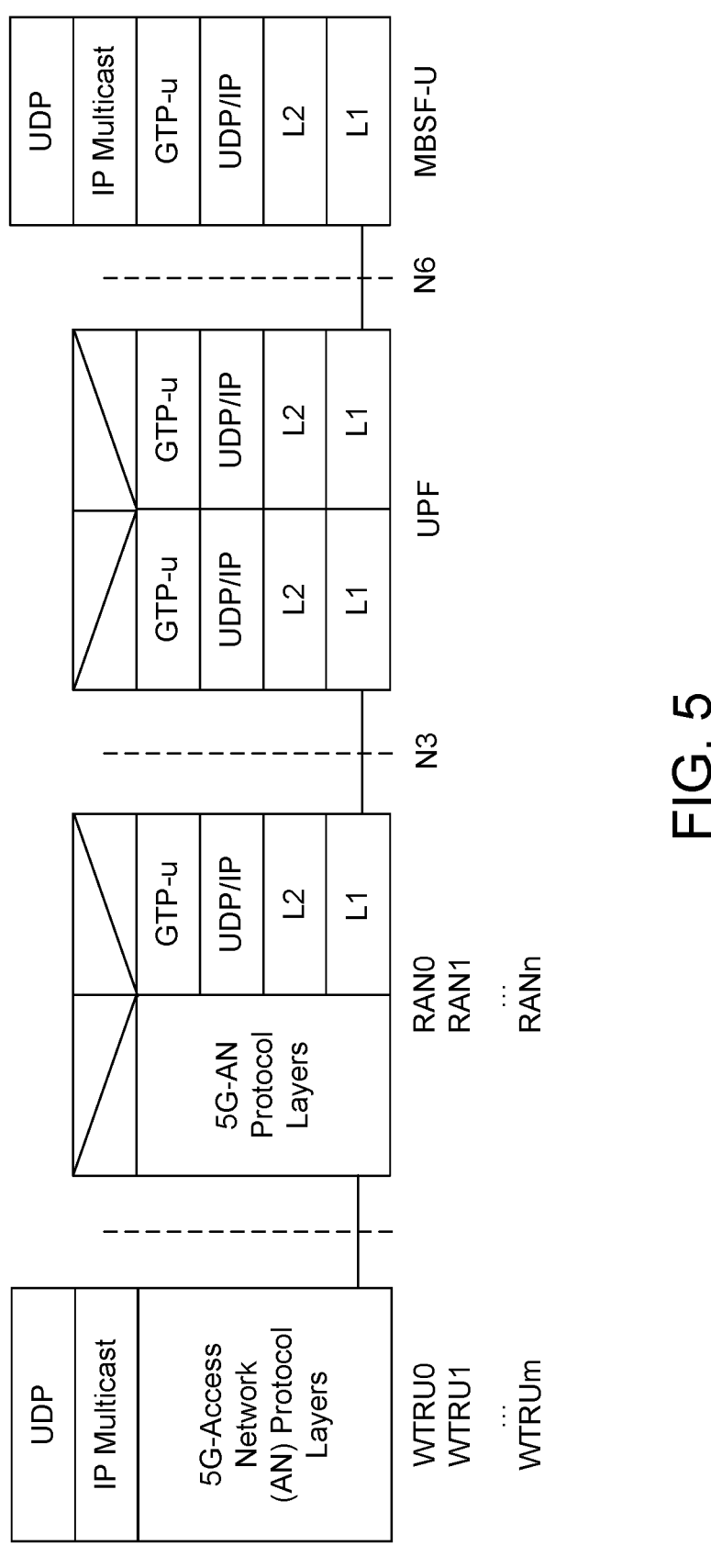
FIG. 5 is a diagram illustrating an example of a MBS user data protocol stack according to an embodiment.

FIG. 5 depicts an example of a diagram of the overall MBS user data path with entities involved and the protocol stack at each level. Accordingly, the IP data of any of an end user and an application to be transmitted to the WTRUs (WTRU0, WTRU1, . . . WTRUm) may be encapsulated in a general packet radio service tunneling protocol user plane (GTP-U) protocol packets and may be transported in a low IP layer from a multicast and broadcast service function user plane (MBSF-U) to RAN entities (RAN0, RAN1, . . . RANn) before being decapsulated and transmitted over the air in PTP or PTM from RANs to WTRUs.

The MBS user data path from the data source (e.g., the service and content provider 200) to multiple WTRUs may be IP based. There may be two delivery methods within 5G CN 208, one method with 5GC individual and another method with 5GC shared MBS traffic delivery. For both methods, the 5G CN 208 may receive a single copy of MBS information (e.g., data). The 5G CN 208 may deliver separate copies to individual WTRUs via per-WTRU PDU sessions or may deliver a single copy to any of one RAN node and multiple RAN nodes. Any of one RAN node and multiple RAN nodes may deliver them to any of one WTRU 216 and multiple WTRUs. At RAN level, the transmission over radio of received MBS packets from 5G CN 208 may be any of PTP and PTM.

Example of Component Flows Identification in an MBS Session

According to step 3.1 and to step 4.1 of the procedures described respectively in FIG. 3 and in FIG. 4, the CP 200 may communicate with the MNO 218 to create the MBS service/session. For example, the CP 200 may provide components (e.g., list of components) in order to allow the MNO 218 to identify them. During this procedure, component flow identifiers (CFI) (e.g., a list of component flow identifiers) may be transmitted (e.g., returned) by the MNO 218 (e.g., transmitted) to the CP 200.

In addition to the type of information (e.g., data, audio, video, . . . ), the parameters associated with the components may include information which may be used to identify the components in the incoming data stream in order to set any of QFI and CFI for the data packets of the service/session. For example, when creating the service/session, the CP 200 may transmit parameters to the MNO 218. The parameters may include any of the following parameters (e.g., a list of specific parameters): an identifier, a type, a protocol and a protocol information. For example, the 'identifier parameter' (e.g., information element) may include any of a number and explicit set of words (such as e.g., "secondary video", "English audio" . . . ). The "type" parameter (e.g., information element) may include, for instance, a multipurpose internet mail extensions (MIME) media type.

The "protocol" parameter (e.g., information element) may indicate at which protocol layer of the incoming packets, the entity processing the flows may look up to identify a component. For instance, in a case where a service session may be delivered in the form of multicast IP packets, the destination multicast IP address may be the same for all the components of this session. IP packets (e.g., all the IP packets) may be delivered by the same source. For example, the source IP address may be a server address. For example, several servers may collaborate to deliver a same service session. In such a case, different source IP addresses may be used.

In a first example, an audio/video service may be delivered over any of real-time transport protocol (RTP) and user datagram protocol (UDP), wherein any component (e.g., each component) may be delivered to its own destination port number. In that case, for any component (e.g., each component), the protocol parameter may indicate UDP and the protocol information may include a 5-tuple.

A 5-tuple may refer to a set of five different values that comprise a transmission control protocol/internet protocol (TCP/IP) connection. It includes a source IP address/port number, destination IP address/port number and the protocol in use.

In a second example, any components (e.g., all components) of the service may be delivered with the same 5-tuple. The identification of the component may be done, for example, at RTP layer. In that case, the protocol parameter may indicate RTP and the protocol information may include a RTP synchronization source (SSRC).

Beyond those two examples, an identification of components within a stream at any level (e.g., including in the payload by parsing the codec headers) may be applicable to embodiments described herein. The protocol and protocol information parameters may be provided (e.g., transmitted) to any entity in the CN for identifying components. Parsing MBS data stream may contribute to identify components (e.g., determination of component identification through MBS data stream parsing).

From the CP 200 point of view, a multicast or broadcast service may be delivered over IP in the form of IP packets sent to a multicast group address. The clients (e.g., WTRUs) of this service may join the multicast group to receive the information (e.g., data), for instance, by performing a "join operation", as described at FIG. 3 and at FIG. 4, via user plane (IGMP/MLD) signaling or by NAS signaling.

Any (e.g., all the) IP packets of an MBS session may be encapsulated in GTP to be transported in the 5G CN 208. The destination multicast IP address used by the content provider 200 and used by the WTRU 216 to consume the service may be referred to herein as high layer multicast (HL MC) address. The destination multicast IP address used for transport multicast tunneling may be referred to herein low layer multicast (LL MC) address. For example, any IP packets (e.g., all IP packets) of a same MBS session may be encapsulated in the same tunnel. The GTP header may be used by UPF 212 and other functions to process the packets in the 5G CN 208.

FIG. 6 is a non-limited example of outline of the GTP header, wherein: Version field may include the version of the GTP protocol, set to "1" for user data tunneling.

Protocol type (PT) field may include information (e.g., 1 bit) that may be used as a protocol discriminator between GTP used for user data (e.g., if PT is "1") and GTP' used for charging data record (e.g., if PT is "0").

Extension header (E) field may indicate the presence of a meaningful value of the next extension header field. In a case where it is set to "0", it indicates that the next extension header field is not present, or if present, it may not be interpreted. In a case where it is set to "1", it indicates a presence of the next extension header field which may be interpreted.

Sequence number (S) field may indicate the presence of a value (e.g., a meaningful value) of the sequence number field. A value of "0" may indicate that the S may not be present or interpreted. The S field may be used as a transaction identity for signaling messages having a response message defined for a request message. It may be, for instance, set to "0" for an MBS session.

Network protocol data unit (N-PDU) number (PN) field may indicate the presence of a (e.g., meaningful) value of the N-PDU which may be used (e.g., only used) for control messages. It may be set to "0" for an MBS session.

Message type field may indicate the type of GTP message.

Length fields may indicate the length in octets of the payload.

Any of the sequence number field, the N-PDU number and any extension headers may be part of the payload, (e.g., as being included in the length count).

Tunnel endpoint identifier (TEID) field may identify (e.g., unambiguously) a tunnel endpoint in the receiving GTP-U or general packet radio service tunneling protocol control plane (GTP-C) protocol entity. The receiving end side of a GTP tunnel may (e.g., locally) determine (e.g., assign) its TEID value. The transmitting side of the GTP tunnel may use the determined TEID value. For example, the TEID values may be exchanged between tunnel endpoints. For 5G MBS, one TEID (called common TEID) may be allocated per MBS bearer service.

For unicast delivery, a PDU session user plane protocol may be associated with any PDU session (e.g., each PDU session). FIG. 7 is an example of an outline of the extension header format. For example, the PDU session user plane protocol data may be conveyed by GTP-U protocol means, more specifically, by means of the "GTP-U container" in the form of a GTP-U extension header. The next extension header type value of the GTP header (octet 12, FIG. 6) may be 1000 0101.

FIG. 8 is an example of a DL PDU session information format. Said DL PDU session information format may allow to provide control information elements related to the PDU session between UPF 212 and RAN 214. For example, the DL PDU session information, which may represent the extension header content of such an extension, may include any of the following parameters (information element).

PDU type=0 for downlink

QMP (QoS monitoring packet): in a case where it is set to "1", the QMP (e.g., 1 bit) may indicate that the transferred packet may be used for QoS monitoring. It may also indicate the presence of the DL sending time stamp in the DL PDU session information frame. SNP (sequence number presence parameter): in a case where it is set to "1", the SNP (e.g., 1 bit) may indicate the presence of the DL QFI sequence number in the DL PDU session information.

The spare fields may be reserved for future use.

The paging policy presence (PPP) parameter (e.g., 1 bit) may indicate the presence of the paging policy indicator (PPI) in a case where it is set to "1". In a case it is present, the PPI may be used for paging policy differentiation, that may allow the AMF 220, based on the operator configuration, to apply different paging strategies for different traffic or service types provided within the same PDU session.

The QFI field may be used by the RAN 214 to determine the QoS flow and QoS profile which may be associated with the received packet. For example, any data (e.g., all data) of a session to be delivered with a same QoS may be associated with (e.g., mapped to) a same QFI.

The DL QFI sequence number field may be used by RAN 214 to determine (e.g., and eliminate) duplicated packets for a given QoS flow. This may be used, for example, in a case (e.g., only in a case) where the QoS flow has been configured eligible for redundant transport bearer.

DL Sending Time Stamp: This field indicates the time when the UPF sends the DL PDU Session Information frame with the QMP field set to 1. It is used only in the downlink direction and encoded in the same format as the 64-bit timestamp format as defined in Section 6 of IETF RFC 5905.

The padding is included at the end of the frame to ensure that the PDU Session user plane protocol PDU length (including padding and the future extension) is (n*4−2) octets, where n is a positive integer. If there is any future extension, the padding should be added after the future extension The PDU session information container may be used for any of the MBS sessions and a dedicated MBS session Information container may be defined.

FIG. 9 and FIG. 10, are two examples of data structures wherein the PDU session information format for those type of session information container may include additional information.

For example, two new fields may be included in the DL PDU session information container for including CFI in an MBS session: an indication (e.g., bit) to indicate the presence of component flow information and another indication (e.g., few bits field) to indicate the CFI data transported in the current GTP packet. As a non-limited example, the spare bits of the DL PDU session information format of FIG. 8 may be used for CFI data, as for instance illustrated in FIG. 9.

In this example, a content flow presence (CFP) information (e.g., 1 bit) may indicate the presence of the CFI when set to "1".

For example, an MBS session may comprise more than 32 flows. The DL PDU session container may include CFI information (e.g., additional or extended field) for identifying the different flows.

According to the embodiment of FIG. 9, CFI field may be in place of the spare field comprising up to five bits of the DL PDU session information format described at FIG. 8. Said five bits of the CFI field may allow to have up to thirty-two different component flows in an MBS session.

According to the embodiment of FIG. 10, CFI field may be a dedicated (e.g., given) field comprising up to eight bits of the DL PDU session information format described at FIG. 8. Said eight bits of the CFI field may allow to have two hundred and fifty-six different component flows in an MBS session.

Example of MBS Session Initialization

According to a non-limiting example of an operating mode, any of the AF, authorized and authenticated by the CN, may invoke procedures supported by the MBSF or the NEF to setup and manage MBS services and sessions. These procedures may allow the content provider to perform service and session management functions such as e.g., any of creation, update and release. A set of properties may be used for the service and session provisioning (such as e.g., any of identifiers, geographical area, QoS information, delivery mode, session start and stop time, etc.). The AF may request the PCF 206 (through NEF or MBSF) to create QoS rules for multicast flows within the multicast session (e.g., QFI) of the MBS service. According to embodiments, a CFI may be allocated (e.g., additionally allocated) to any (e.g., each) application component flow. The MBSF may request, to MB-SMF(s), an MBS session setup which may be selected based on their coverage and the target service area. The MB-SMF may get authorization for the QoS profile from the PCF 206 (QFI+CFI). The MB-SMF may establish a transport tunnel between the 5G CN 208 entry point and the RAN(s) with QFI+CFI included in the tunnel header. For an MBS session that may have any number of component flows, the WTRU 216 may be configured to receive a subset (e.g., only a subset) of these flows. The RAN 214 may be in charge of applying efficient filtering of the multicast flows (based on CFI) and may select a delivery method (PTP or PTM) to respond positively to its WTRU 216 population sharing the MBS session.

According to an example, in a case where the session is started, the RAN 214 may provide QoS for any component (e.g., all components) flow transmission. For example, the RAN 214 may fulfill the requirements (e.g., may guarantee it may fulfill) of all QoS flows composing the MBS session. For example, the RAN 214 may transmit correctly any components (e.g., all components) of the content at the same time. In addition, e.g., in its internal management of resources, the RAN 214 may also:

Save energy and reduce the electromagnetic waves spreading by not using radio resources that may be associated with not-requested component flows.

Use the radio resources of not-requested component flows to transmit data for other services, in a best-effort manner. This may allow to increase the overall transmission in the cell for services which may have no QoS reservation or may benefit from getting more than their QoS (e.g., guaranteed QoS). For example, in a case where a new component flow is requested, the corresponding resources may be (e.g., instantly) reallocated (e.g., given back) to the MBS session.

Example of Determining CFI Mapping

In a first embodiment, e.g., during service announcement to the WTRU 216, the WTRU 216 may be provided with a list of pairs of 5-tuples, used by application consuming the MBS session to receive data through UDP/TCP sockets, and CFI, used by the low layer to identify flows. For example, the WTRU 216 may receive information, according to the service announcement, indicating which service components may be present in an MBS session, the associated transport IP addresses and ports. After the WTRU 216 has received this information, the CFI associated with a service component may be determined by the WTRU 216, for example, by building a lookup table. In this embodiment, the WTRU 216 may include CFI values (e.g., a list of CFI values) in its NAS messages to the AMF 220.

In a second embodiment, the mapping between CFI and 5-tuples may be obtained by the WTRU MBS aware application (e.g., directly) from the MNO 218 or the content provider 200. Before joining the MBS session, the WTRU 216 may (e.g., explicitly) request the information about mapping CFI to service components. This may be done e.g., by transmitting an HTTP GET request to any server in charge of providing the way to retrieve the service and receiving an extensible markup language (XML) or a java script object notation (JSON) document as a response. For example, the server may be known by application-level interaction through service announcement and pre-configured in the application. The WTRU 216 may request and may receive the CFI values (e.g., complete list of CFI values) or may request (e.g., specifically) for the components it may want to receive.

In a third embodiment, the CFI may not be provided to the WTRU 216. In such a case, the WTRU 216 may have the knowledge of 5-tuples which may correspond to the service components. In a case where the (e.g., list of desired) component flows are signaled to the AMF 220, the WTRU may use these (e.g., list of) 5-tuples, for example, instead of (e.g., a list of) CFI. For example, the network entities may translate the 5-tuples to CFI when handling these messages.

Example of Component Flow Selection for Transmission

In two different scenarios, as non-limiting examples, a new WTRU 216 may join an MBS session, which may have already been announced and may be available in its current cell. These two scenarios differ on the signaling for session joining, which may be done with control plane messaging or through the user plane transporting IGMP/MLD messages (e.g., which may be used to ease the support of legacy multicast applications). The authorization and authentication mechanisms are not described here but it may be considered that the WTRU 216 may be authorized to join an MBS service session.

Figure 11:
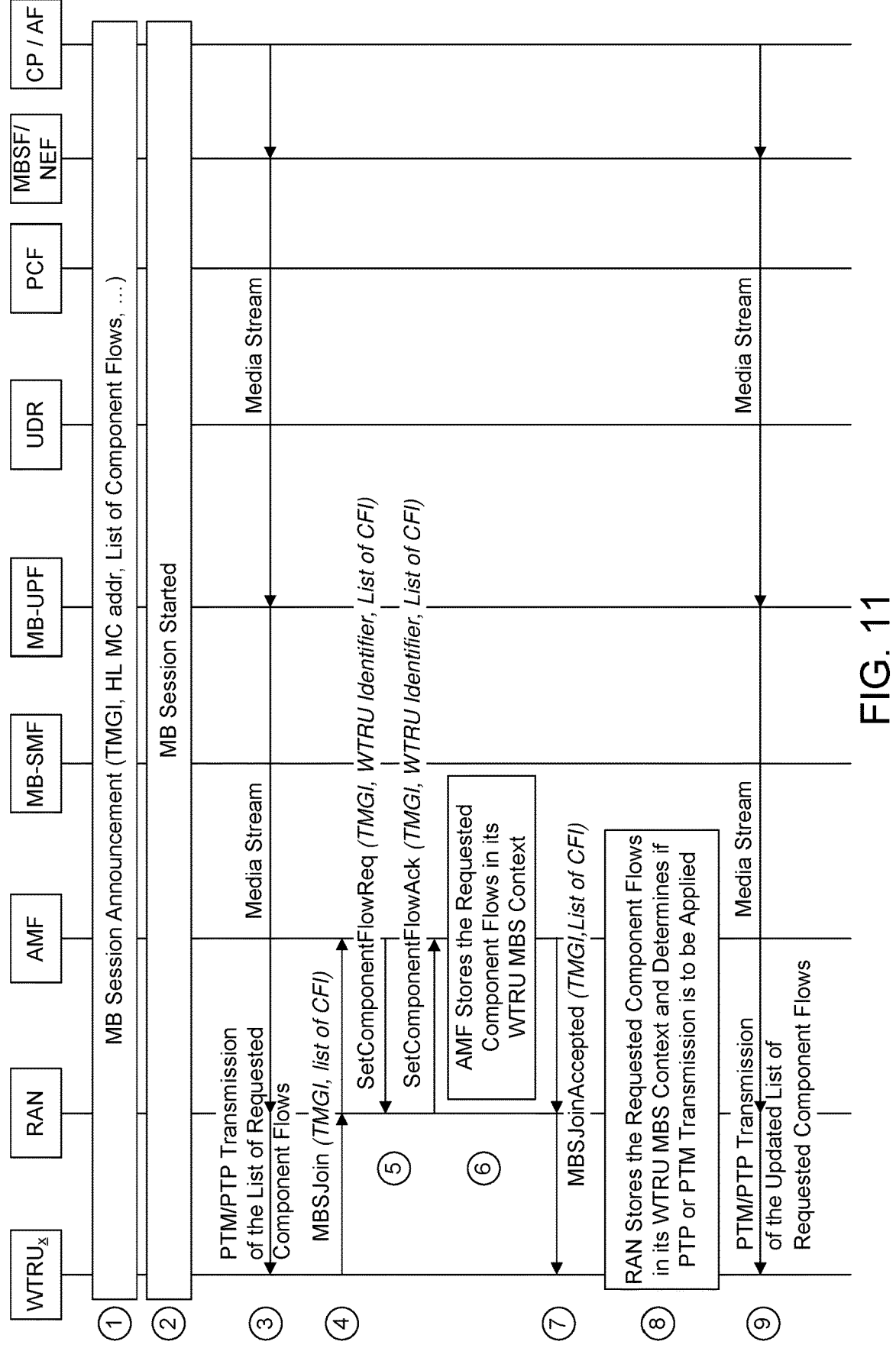
FIG. 11 is a sequence diagram illustrating an example of a WTRU requesting component flows in case of an established MBS session through control plane according to an embodiment.

FIG. 11 is an example of a sequence diagram wherein session joining by a WTRU 216 may be triggered by a control plane message. According to FIG. 11, the following steps may correspond to a WTRU 216 requesting component flows in case of an established MBS session.

Step 11.1 may correspond to MBS session announcement. The WTRU 216 may receive from the AF a message indicating (e.g., informing) various information including any of the TMGI, and the HL MC address. The various information may further include the component flows (e.g., list of component flows) of the MBS session and selectable by the WTRU 216. The message may include information indicating the manner to retrieve the component flows (HTTP get . . . ).

Step 11.2 may include the session start procedure. The AF may activate the MBS session which may result in the resources reservation in the MB-UPF and in the RAN 214 (where WTRU 216 may have joined the MBS session).

At step 11.3, the AF may transmit the DL media stream as an IP multicast stream using the HL MC address. Any of the MBSF and MB-UPF functions may encapsulate the traffic into GTP with the CFI indication. The WTRU 216 may receive from the RAN 214 the media data associated with the (e.g., list of) requested component flows via any of PTP and PTM. For example, the RAN 214 may deliver the media data associated with the (e.g., list of) requested component flows by the WTRUs via any of PTP and PTM. Details are described according to step 11.8.

At step 11.4, the WTRU 216 may indicate its interest to join the MBS session by sending a NAS MBS session join request message towards the AMF 220. The message may include any of the TMGI and the (e.g., list of) component flows that the WTRU 216 may be interested in. A mapping between CFIs and the type of components (for instance, french audio track is on flow ID 10, english audio track is on flow ID 11 . . . ) may be also available at MBS aware application level in the WTRU.

At step 11.5, the AMF 220 may transmit a signal to the RAN 214 (e.g., notify the RAN) with the corresponding information, including any of the TMGI, the WTRU 216 identifier and (e.g., the list of) requested component flows identifiers (CFI). An acknowledgement response may be sent by the RAN 214 to the AMF 220 to confirm the requested components may be delivered.

At step 11.6, the AMF 220 may store the requested component flows in its WTRU MBS context and, according to step 11.7, may create a NAS session join accept message including an indication confirming to the WTRU 216 the availability of the service.

At step 11.8, the RAN 214 may store the requested component flows in its WTRU MBS context and may determine if PTP or PTM transmission may be applied. In case of PTP transmission, the WTRU 216 may receive the component flows (e.g., the list of component flows) it may have requested. In case of PTM transmission, the WTRU 216 may receive all the component flows requested by the set of WTRUs having joined the MBS session.

According to step 11.9, the RAN 214 may deliver the (e.g., list of) requested components flows.

Figure 12:
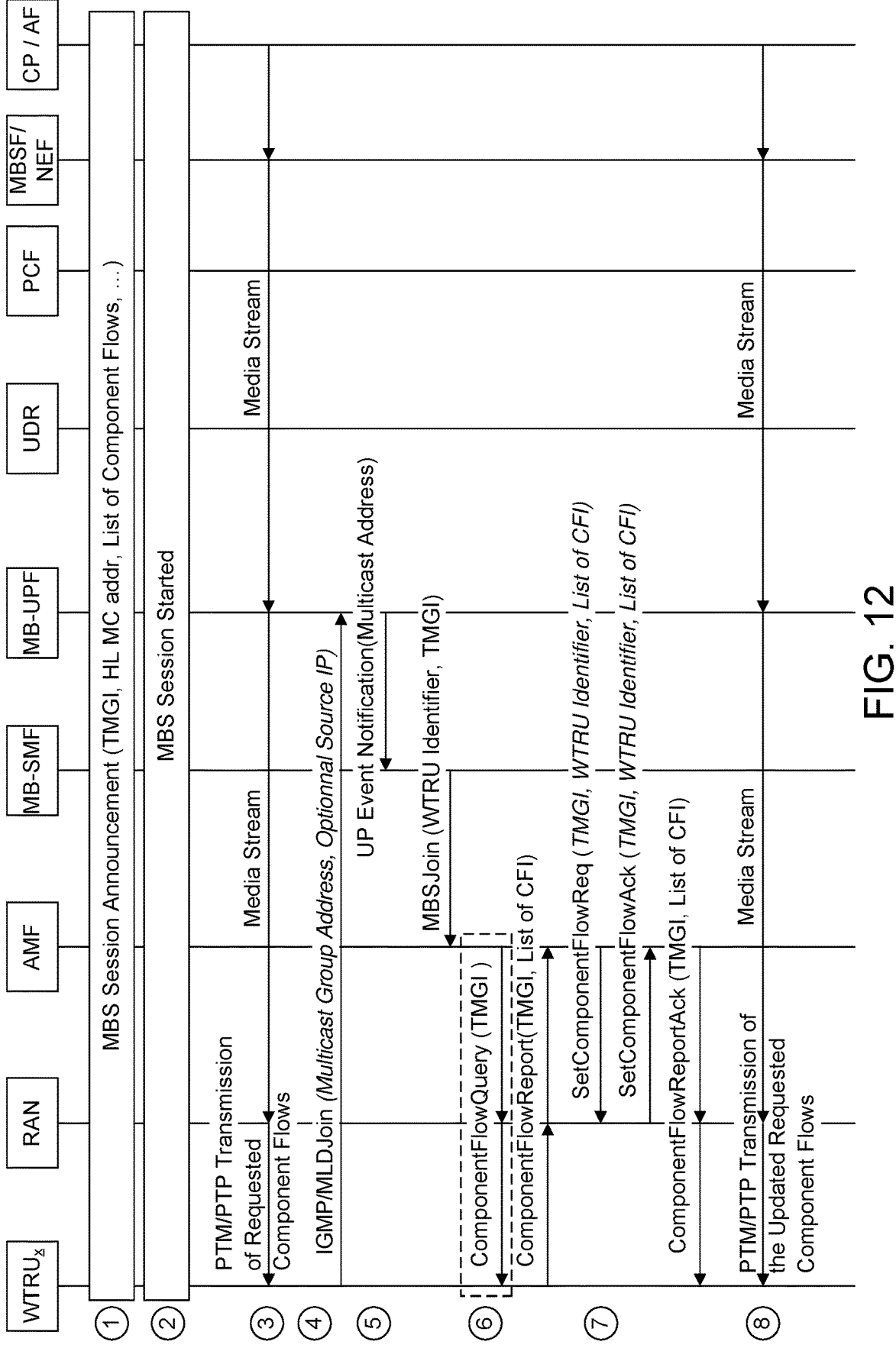
FIG. 12 is a sequence diagram illustrating an example of a WTRU requesting component flows in case of an established MBS session through user plane according to an embodiment.

FIG. 12 is an example of a sequence diagram wherein session joining by a WTRU 216 may be triggered by any of a user plane IGMP and MLD message. According to FIG. 12, the following steps may correspond to a WTRU 216 joining an established session through user plane (IGMP/MLD).

Step 12.1 may correspond to MBS session announcement. The WTRU 216 may receive from the AF a message indicating (e.g., informing) various information including any of the TMGI, the HL MC address. The various information may further include the component flows (e.g., list of component flows) of the MBS session and selectable by the WTRU 216. The message may include information indicating the manner to retrieve the component flows (HTTP get . . . ).

Step 12.2 may include the session start procedure. The AF may activate the MBS session which may result in the resources reservation in the MB-UPF and in the RAN 214 (where WTRU 216 may have joined the MBS session).

At step 12.3, the AF may transmit the DL media stream as an IP multicast stream using the HL MC address. Any of the MBSF and MB-UPF functions may encapsulate the traffic into GTP with the CFI indication. The WTRU 216 may receive from the RAN 214 the media data associated with the (e.g., list of) requested component flows via any of PTP and PTM. For example, the RAN 214 may deliver the media data associated with the (e.g., list of) requested component flows by the WTRUs via any of PTP and PTM.

At step 12.4, the WTRU 216 may issue a join request by sending any of an IGMP and MLD packet in the user plane and the MB-UPF may detect it.

At step 12.5, the MB-UPF may transmit a signal indicating the detected user plane event to the MB-SMF e.g., including the WTRU 216 identifier e.g., to be able to check its authorization to access the multicast group. If the WTRU 216 is authorized, MB-SMF may include it in the MBS session context and may forward the information to the AMF 220 with which the WTRU may be registered, as described with reference to step 3.3 of FIG. 3.

At step 12.6, the AMF 220 may store the TMGI in the WTRU MBS context. At this point there may be two embodiments to get the (e.g., list of) requested component flows from the WTRU 216:

According to one embodiment, the WTRU 216 may receive from the AMF 220, a NAS message including a request to obtain the (e.g., list of) components that the WTRU 216 may want to receive. The WTRU 216 may transmit a message by sending a NAS MBS session component flow report message, which may contain the (e.g., list of) components for the WTRU 216.

According to another embodiment, the WTRU 216 may send, e.g., after the session join message, a NAS MBS session component flow report message, which may contain (e.g., the list of) components identifiers (CFIs) for the WTRU 216. If the AMF 220 receives this message before the WTRU 216 may have been attached to its MBS session context (step 12.5 pending), then the AMF 220 may create an inactive WTRU MBS context containing the (e.g., list of) CFIs.

At step 12.7, the AMF 220 may transfer to the RAN 214 a request, including any of the TMGI, the WTRU 216 identifier and the (e.g., list of) CFIs. An acknowledge response may be sent by the RAN 214 to the AMF 220 to confirm the requested components may be delivered. The WTRU 216 may receive a message from the AMF 220 indicating that the component request was handled. For example, the AMF 220 may confirm to the WTRU 216 that the component request was handled.

In Step 12.8, the RAN 214 may deliver the (e.g., complete list of) requested components flows.

Figure 13:
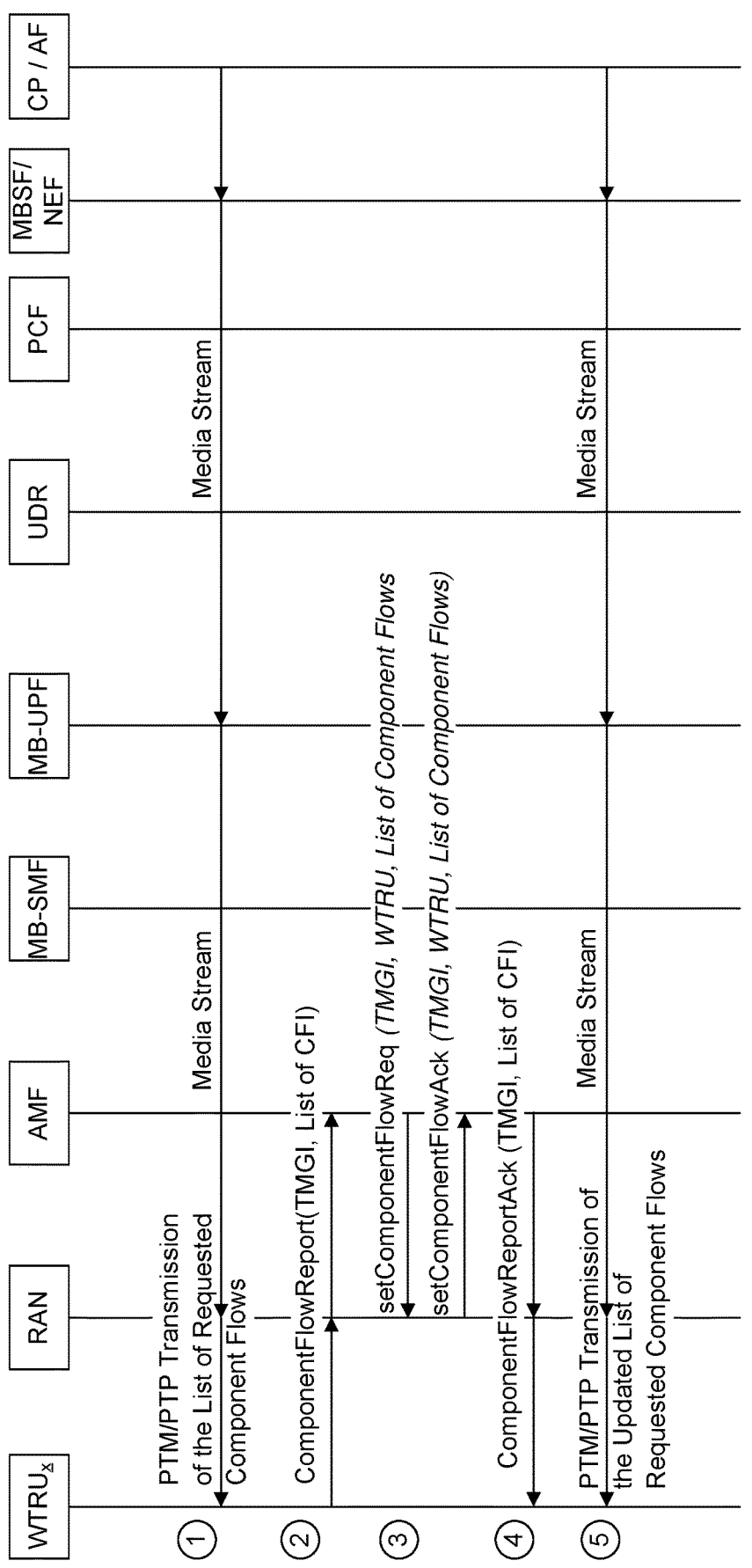
FIG. 13 is a sequence diagram illustrating an example of a WTRU updating its components according to an embodiment.

FIG. 13 is an example of a sequence diagram wherein a WTRU 216 may update its components (e.g., change its components list).

Depending on the MBS service, the WTRU MBS aware application may (e.g., at some point in time) change the (e.g., list of) components that it may receive. For example, in a multimedia session, the end user may change an audio language selection, or add/remove subtitles, etc. To allow the reception of corresponding content data, the WTRU 216 may transmit a message to the network indicating the change (e.g., in the list) of components.

For example, WTRU 216 may send messages to the network for any of addition and removal of specific components. In another example, the (e.g., complete list of) components for the WTRU 216 may be sent when the WTRU MBS aware application may operate a change. This may be more robust since the entities managing the update may have an accurate view of the components (e.g., the complete list) for a WTRU 216 at any time. The additions and removal of components may be prone to error, for example, in case of loss of a message, or in case of sequencing (e.g., ordering) of messages. The penalty in signaling load may remain limited, since the number of components used by a WTRU 216 may generally be small. It may make the message of more general use: a same message may be used for any of initial (e.g., list of) components, and as an answer to an inventory (e.g., repeated, or periodic inventory).

FIG. 13 may illustrate the dynamic change of the components the WTRU 216 may be interested in with the same message that may have been used for joining the MBS session. The following steps may describe an update of WTRU's components (e.g., list).

At step 13.1, some set of components flows may be transmitted to the WTRU.

At step 13.2, the WTRU 216 may signal a (e.g., desired) change (e.g., in the list) of components it may request to receive, by sending a NAS message component flow report towards the AMF 220, indicating the TMGI and the (e.g., list of) CFI.

At step 13.3, the AMF 220 may transmit a message (e.g., a signal) indicating the change (e.g., update of component(s) (e.g., new list of component(s)) to the RAN 214, associated with the WTRU 216 and the TMGI. The RAN 214 may take the change of component(s) (e.g., new list) into account and may acknowledge it to the AMF 220.

At step 13.4, the WTRU 216 may receive from the AMF 220 a message of acknowledgment indicating that the change request for components has been handled.

At step 13.5, the set of components flows transmitted to the WTRU 216 may indicate the new configuration. This may include any of the components requested by the WTRU 216 and what other WTRUs may receive in a case where they are on the same PTM.

According to an embodiment, a WTRU 216 may leave an MBS session by any of an explicit message and a timeout on a router request for membership report which may trigger the dedicated CN function (AMF, MB-UPF or MB-SMF). The explicit message may include any of a NAS message and a UP IGMP/MLD membership report. The CN function may delete the WTRU MBS context and may notify the RAN 214. In that case, according to embodiments, the RAN 214 may delete its storage related to the components used by the leaving WTRU 216. For example, at the same time, the RAN 214 may re-compute the (e.g., list of) components that may still be requested by remaining WTRUs.

According to one example relative to an WTRU 216 moving out of the RAN 214 coverage. There may be cases where the WTRU may "leave" a given RAN 214. The WTRU 216 may explicitly de-register from the network. It may move out of coverage of any RAN 214. It may handover from one cell to another, leaving one RAN 214 and being handled by another one. Accordingly, in a case where the WTRU 216 is no more handled by a RAN 214, said RAN 214 may delete (e.g., forget) the WTRU MBS contexts, and this may include the associated (e.g., list of) requested component flows. For example, said RAN 214 may re-compute the (e.g., list of) components that may still be received by remaining WTRUs. In the case of handover, the target RAN 214 may be informed by the AMF 220 that the WTRU 216 may be included. The AMF 220 may transmit a signal to the target RAN 214 including the component flows for any MBS session of the arriving WTRU 216, with a message set 'component flow req'. In case the handover operates a change of the serving AMF 220, the source AMF 220 may send the WTRU MBS context with the (e.g., list of)

CFIs to the target AMF 220 or the target AMF 220 may send a 'component flow query' to the WTRU 216 to obtain the CFIs (e.g., the list of CFI).

Figure 14:
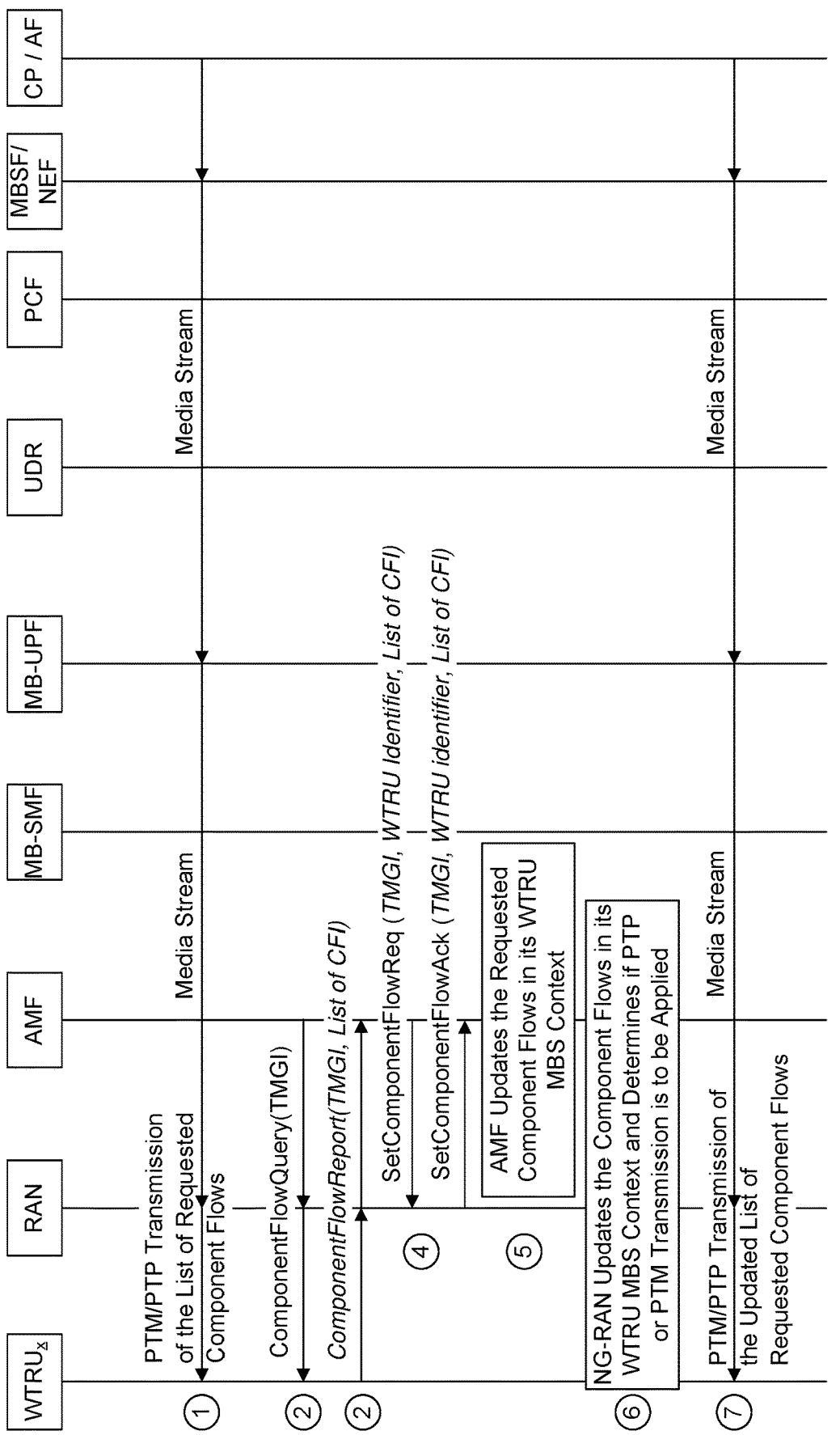
FIG. 14 is a sequence diagram illustrating an example of a mechanism used for a periodic inventory of desired component flows according to one embodiment.

Example of Inventory of Requested Component Flows of an MBS Session Within a Cell FIG. 14 is a non-limiting example of a sequence diagram of a mechanism used for a repeated (e.g., periodic) inventory of requested (e.g., desired) component flows. The following steps may describe a repeated (e.g., periodic) inventory of component flows of an MBS session.

At step 14.1, some set of components flows may be transmitted to the WTRU 216.

At step 14.2, in order to maintain the (e.g., list of) components which may be received in an MBS session, the WTRU 216 may be repeatedly (e.g., periodically) polled to collect the (e.g., list of) component flows that it may be interested in. The AMF 220 may repeatedly (e.g., periodically) send an MBS 'component flow query' message containing a TMGI to trigger the RAN 214 to ask the WTRU 216 the (e.g., list of) component flows that it may be interested in. Said 'component flow query' message may be (e.g., only) sent to the WTRU 216, e.g., triggering a single report, or to the WTRUs (e.g., all WTRUs) connected to the session identified by the TMGI, e.g., triggering multiple reports.

At to step 14.3, an MBS 'component flow report' message may be transmitted by the WTRU 216 to provide the AMF 220 with (e.g. the list of) the component flows, relative to the TMGI, the WTRU 216 may be consuming. If some WTRU 216 did not respond to the 'component flow query' message of step 14.2, a dedicated (e.g., given) query may be sent to them by the AMF 220. As an example, wherein the WTRU 216 is not repeatedly (e.g., periodically) polled, the WTRU 216 may repeatedly (e.g., periodically) send its reports. For example, the frequency of report sending may be configured as a part of session announcement or by a dedicated signaling. This last option may allow to update the report frequency at any time. In both alternatives, a randomization mechanism may be used to avoid flooding the control plane with hundreds of simultaneous reports. WTRU 216 may then send the report with a random delay—in a configured interval—between the reception of 'component flow query' and a nominal time of sending the report.

According to step 14.4, the AMF 220 may transmit a message to the RAN 214 (e.g., notify the RAN) with information, including any of the TMGI, the WTRU identifier and the updated (e.g., list of) CFIs. An acknowledgement response may be sent by the RAN 214 to the AMF 220 to confirm the requested components may be delivered.

According to step 14.5, the AMF 220 may update its WTRU MBS context with the requested component flows.

According to step 14.6, the RAN 214 may store the (e.g., list of) updated component flows in its WTRU MBS context and may determine if any of PTP and PTM transmission may be applied.

According to step 14.7, the RAN 214 may deliver the (e.g., list of) updated components flows.

Example of Filtering of Components Before Wireless Transmission by the RAN

According to some embodiments, the RAN 214 may be able to have a complete view of the component flows that any (e.g., each) WTRU attached to the RAN may receive. The RAN 214 may, for example, determine the delivery mode as PTP or PTM as applicable to any WTRU, for a given MBS session.

For a PTM or a PTP transmission link used for the session delivery, there may be an associated set S of WTRUs that may be connected. In case of a PTP link, S may be a singleton, in case of PTM link, S may have any number of WTRUs. For example, in a RAN 214, more than one PTM link may be established, for separate groups of WTRUs and for the same MBS session. From this set, the RAN 214 may determine the (e.g., list of) component flows that may be received by at least one of the WTRUs in S.

The component(s) (e.g., the component list) associated with any (e.g., each) link may be computed e.g., when a new WTRU joins the session in the RAN 214, or leaves the session or leaves the RAN 214 (e.g., handover), or requests for a change in the components it may (e.g., want to) receive. Between such events, the RAN 214 may store in memory the components (e.g., the component lists) associated with the links and may refer to these components (e.g., component lists) e.g., when filtering a packet.

Any time a packet is received on the N3 tunnel corresponding to the multicast session, the RAN 214 may read the flow id which may be present in the GTP header. In such a case, the RAN 214 may perform the mapping of the QoS flow to access network resources, based on the QFI indicated in the GTP header. For example, the RAN 214 may check whether the component flow id belongs to the components (e.g., the component list) of the resource. If the flow id is listed, then the packet may be forwarded on the radio, otherwise the packet may be discarded.

This process may be implemented in a RAN 214. The process may comprise a step of reading field (e.g., additional field) of the GTP header, as parsing the GTP header may have been already processed. Another step may comprise a simple lookup in a list to decide to discard the packet if the target resource has been chosen.

For multicast services, a packet may be sent both on PTM to a set of WTRUs and in PTP for other WTRUs. In this case, the decision of discarding the packet may be taken independently for a (e.g., each) transmission of the packet.

The reduction in the number of packets transmitted on the radio link may provide at least two benefits that the RAN 214 may use. The first benefit may be that spared bandwidth may be re-allocated to a best-effort PDU session. For example, any time the set of transmitted MBS component flows may change, the RAN 214 may re-allocate the resources to the MBS service, since the boost of the other session may not be provided (e.g., guaranteed) by the QoS of the other session. The second benefit may be that spared bandwidth may allow the RAN 214 to make a stronger transmission of the MBS session, e.g., by increasing the forward error correction (FEC) redundancy. This may improve the robustness of MBS, so that WTRUs may improve their reception, e.g., for WTRUs that may be far from an antenna of a base station.

In another embodiment, the RAN 214 may be not able to have a complete view of the component flows that a (e.g., each) WTRU attached to the RAN 214 may receive or may not have capabilities for filtering of components before wireless transmission. The filtering may be done by the upstream tunnel endpoint, for example, UPF or MBSF, which may encapsulate the data flows in a dedicated tunnel.

Multicast and Unicast Transmission

Multicast or broadcast transmissions may be efficient techniques to deliver a same content to a set of terminals. In order to deliver data to (e.g., all) WTRUs of a multicast group, the RAN 214 may adapt the transmission characteristics to the WTRU that may have the lowest reception level. This may lead to use a modulation and coding scheme very costly in bandwidth occupation and may increase the transmission power or, (e.g., otherwise) to deteriorate the service because of an excessive error rate in transmission to certain WTRUs. For example, the feedback mechanism of a unicast transmission may allow repetition in case of lost packet and link adaptation based on metrics. Using such a multicast transmission instead of the multiple-unicast scheme may allow to reduce resources consumption, for example, in a case where there is a determined (e.g., sufficient, given) number of receivers.

There may be two diverging trends:

The scenario in which multicast technology may offer a significant spectral efficiency gain is where a plurality of WTRUs may be receiving the exact same data (e.g., multimedia) stream.

Meanwhile, content creators and broadcasters may diverge from traditional single stream offerings, increasingly providing individual users with greater choices to personalize the way in which they consume content. These enhanced offerings may open additional revenue streams for mobile operators and content creators who may offer premium services to end users, thereby enhancing a live event.

The choice of mode of transport in a cell may be made globally by the RAN 214 for any (e.g., all) WTRUs receiving a given MBS service. In a case where the number of WTRUs in the cell may be large enough, the RAN may estimate that a PTM transmission may be less costly despite the fact that the complete session may be transmitted to all WTRUs, even if not all users may be using the whole content, as for instance all the components.

For example, a popular component may be delivered via multicast, in order to maximize spectral efficiency. For example, components of the service that may be of interest to a limited set of receivers may not be delivered separately via dedicated PTP streams to a selected subset of end users. The configuration of the mixed PTM/PTP transmission may not be chosen at the RAN 214 level for adaptation to the usage of the service in a given cell.

According to embodiments above, components that may not be used by any WTRU in the cell may be filtered out. In a case where at least one WTRU is interested by a specific component, said specific component may be transmitted. For example, in the PTM mode, resources may be used by the RAN 214 to transmit this specific component to all WTRUs receiving the service. If the WTRU requesting this component is close to the base station, the cost of a PTP transmission of the component to this WTRU may be much less than multicasting it to the full cell.

Hybrid Unicast Multicast Delivery of Service

For improving the efficiency of the transmission resource, the delivery of certain components of service may be performed by multicast and some others (e.g., directly) in unicast (e.g., directly in unicast) to the interested WTRUs. A method for such improvement may comprise the following features:

split of an MBS wireless transmission where some components may be transmitted in unicast and others in multicast;

transmission of information to a WTRU 216 to indicate how components may be retrieved, as for example, on request and response during a join session, or through MCCH during the service delivery;

procedure to indicate to a WTRU 216 that a component transmitted in unicast may be available in multicast;

procedure to indicate to a WTRU 216 that a component transmitted in multicast may be available in unicast.

According to one embodiment, instead of transmitting the entire content of the session in PTM or PTP mode, the RAN 214 may use a more detailed organization where any component flow (e.g., each component flow) may be individually assigned to any of:

a single PTM radio bearer, that may be received by (e.g., all) WTRUs (e.g., all WTRUs joined to the MBS);

a number of PTP radio bearers, (e.g., each one) delivering the component to one interested WTRU; and no transmission in the case where no WTRU has indicated interest in the reception of the component.

The RAN may re-evaluate the entire configuration—considering all components and all WTRUs—when a change in the context changes the decision, including but not limited to:

a new WTRU joins the session or the cell. It may be determined how this WTRU may receive the components it may request. The decision may also influence how other WTRUs in the session may receive the components;

a WTRU leaves the session or the cell;

a WTRU moves in the cell and transmits a signal indicating (e.g., may signal) changes in quality of the radio reception; and a WTRU transmits a message indicating a change in the (e.g., list of) components it may receive (e.g., request).

The decision of delivering a component flow in PTP or in PTM may depend on any of parameters: the number of WTRUs interested by the component, the link budget of a WTRU requesting the component, the coverage of the multicast radio bearer(s), and the QoS requirement of the component flow.

The global performance of a wireless transmission may depend on the signal-to-noise (S/N) ratio at the receiver (e.g., achievable S/N). The signal-to-noise ratio represents the strength of the signal compared to noise interference. The S/N measurement may be achieved by the WTRU and may be transmitted to the RAN 214 for decision. It may also be estimated by the RAN 214 based on the location of the WTRU, e.g., its geographical position or its antenna sector.

The ability of a WTRU to receive and use data may depend on the bit error rate (BER). The latter may be affected by any of transmission channel noise, interference, distortion, bit synchronization problems, attenuation, wireless multipath fading, etc. The decision taken by the RAN 214 of using any of PTP and PTM mode may be based on the feedback of the WTRUs. The reception quality information provided by the WTRUs may be relative to an existing multicast channel or to a potential unicast bearer to be established.

According to the present embodiments described herein, the WTRU 216 may be a (e.g., any of multicast and unicast) gateway (e.g., wireless box) that may receive multicast flow containing only service components, wherein the service components may be service components requested by devices wirelessly attached to the wireless gateway.

Indication of Hybrid Delivery Parameters in Response to a WTRU Join Request

Figure 15:
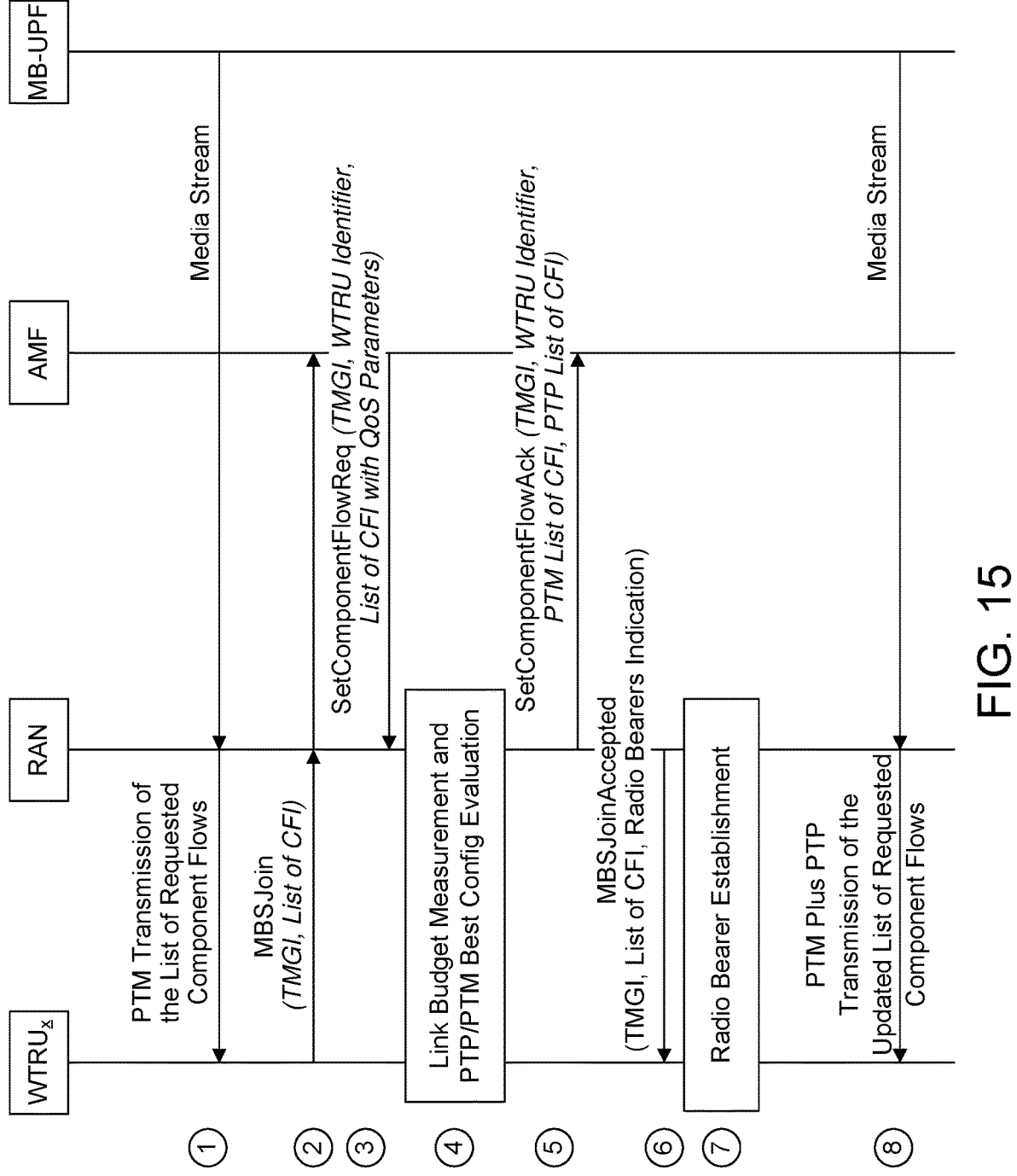
FIG. 15 is a sequence diagram illustrating an example of a WTRU joining an MBS service/session with hybrid unicast multicast delivery of service components according to an embodiment.

FIG. 15 is an example of a sequence diagram wherein a WTRU 216 is joining an established MBS session and wherein some service components may be delivered in multicast and other service components in unicast. According to FIG. 15, the following steps may correspond to a hybrid unicast multicast delivery of service components to a WTRU 216 joining an MBS session.

At step 15.1, the AF may transmit the DL media stream as an IP multicast stream using the HL MC address (not shown). Any of the MBSF and MB-UPF functions may encapsulate the traffic into GTP with the CFI indication. The WTRU 216 may receive from the RAN 214 the media data associated with the (e.g., list of) requested component flows via any of PTP and PTM. For example, the RAN 214 may deliver the media data associated with the (e.g., list of) requested component flows by the WTRUs via any of PTP and PTM.

At step 15.2, the WTRU 216 may indicate its interest to join the MBS session by sending a NAS MBS session join request message towards the AMF 220. The message may include any of the TMGI and the (e.g., list of) component flows that the WTRU 216 may be interested in. A mapping between CFIs and the type of components (for instance, french audio track is on flow ID 10, english audio track is on flow ID 11 . . . ) may be also available at MBS aware application level in the WTRU.

At step 15.3, the AMF may notify the RAN 214 with information, including any of (e.g., providing any of) the TMGI, the WTRU identifier and the (e.g., list of) requested component flow identifier (CFI). If the components (e.g., all the elements of the list of components) have been already transmitted in multicast, the RAN 214 may update its internal status of the MBS session by adding the WTRU 216 and its associated component flows respectively as destination terminal and components to be delivered.

At step 15.4, a link budget measurement may be evaluated (e.g., performed) between WTRU 216 and RAN 214 such that the choice of delivering a service component in any of PTP and PTM may be arbitrated by the RAN 214.

At step 15.5, after the evaluation of the most efficient way to deliver the component flows requested by the WTRU 216, RAN 214 may respond to AMF through a message, as per example a 'set component flow ack' message, providing the choice of any of PTP and PTM for the type of delivery selected for any component flow (e.g., for each component flow) requested by the WTRU 216.

At step 15.6, the RAN 214 may respond to the WTRU 216 by indicating the procedure to be applied to receive the requested component flows and may store the information in the WTRU MBS context. As non-limiting example, the delivery method indication for a component flow may be according to any of the two following cases:

Multicast delivery;

Unicast delivery with instruction for unicast radio bearer establishment.

For multicast delivery, the WTRU 216 may set up the reception of the component flow based on information received in MCCH.

For unicast delivery, RAN 214 and WTRU 216 may establish a PTP radio bearer by means of radio resource control (RRC) procedure.

At step 15.7, for radio bearer establishment, the WTRU 216 consuming an MBS service may monitor MCCH to be aware of the potential changes of the delivery method and to get subframe allocation and modulation coding scheme (MCS) for data delivered in multicast. For example, if a component was delivered to a first WTRU 216 in PTP and the RAN 214 change delivery of the component to PTM because of another WTRU requesting this component, the first WTRU may obtain (e.g., discover) the change based on MCCH monitoring.

At step 15.8, RAN 214 may transmit the components identified by CFI through any of multicast and unicast bearers according to the evaluation described at step 15.4.

Hybrid Unicast Multicast Reevaluation with MCCH Signaling

A WTRU 216 interested in the reception of 5MBS service(s) may obtain (e.g., discover) the multicast configuration. For a 5MBS session, control parameters, e.g., transmitted periodically through the MCCH, may allow to indicate to the WTRU 216 the physical resources (radio bearer(s), scheduling Information, . . . ) used for the service content. According to embodiments, the signaled service may include information allowing the WTRU 216 to discover in the MCCH the service components transmitted in multicast (PTM) and the service components transmitted in unicast (PTP).

Figure 16:
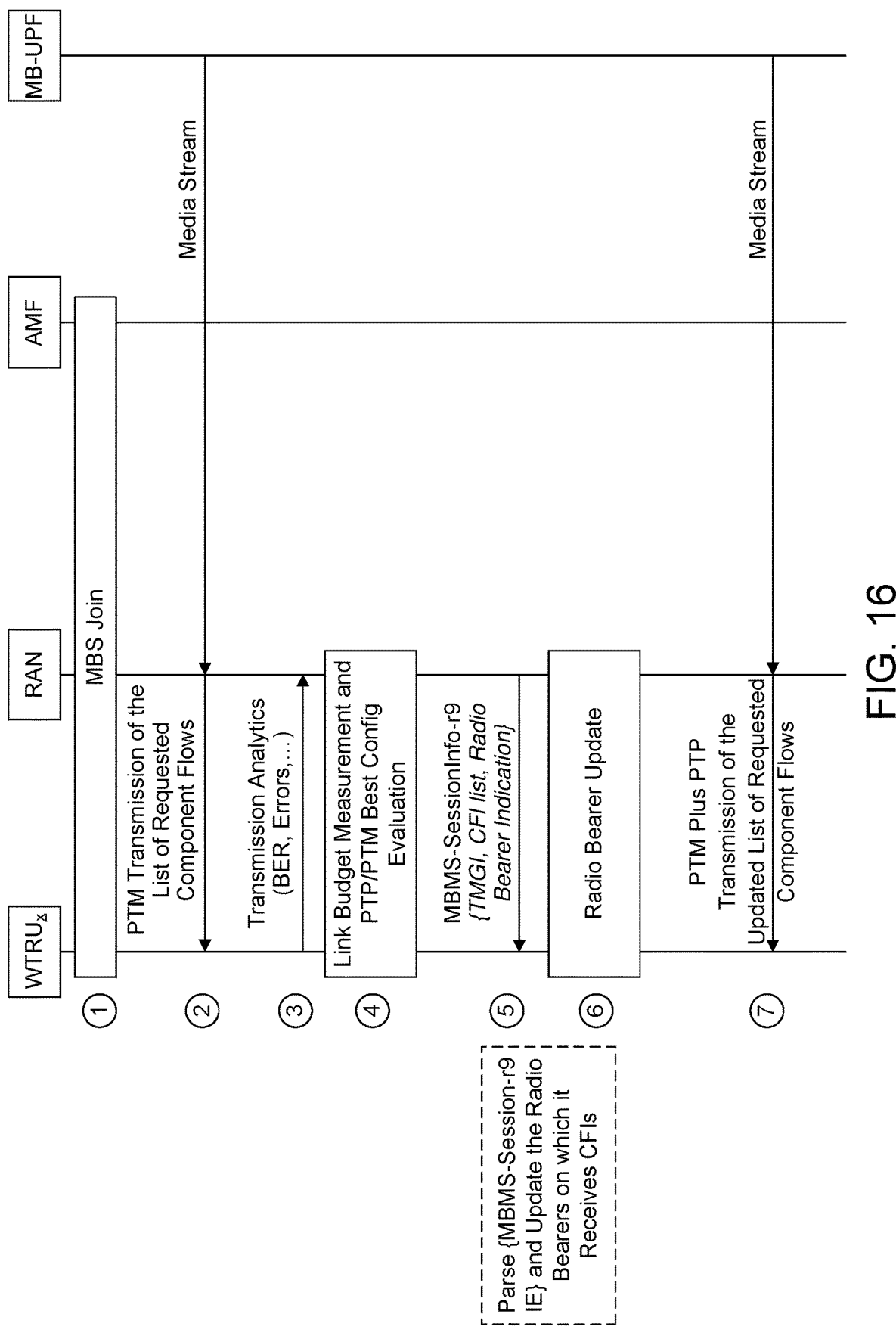
FIG. 16 is a sequence diagram illustrating an example of a hybrid unicast multicast delivery reevaluation via multicast control channel (MCCH) according to FIG. 15.

FIG. 16 is an example of a sequence diagram wherein a reevaluation of the CFI component configuration is using the MCCH signaling.

At step 16.1, the WTRU 216 may join the MBS session.

At step 16.2, the WTRU 216 may receive the component flows on both PTP and PTM radio bearers determined by the RAN 214, as described at step 15.8 of FIG. 15.

At step 16.2, the over-the-air transmission (e.g., link budget, BER) may be evaluated (e.g., constantly evaluated).

At step 16.3, analyzes of over-the-air transmission (e.g., link budget, BER) may be transmitted to RAN 214.

At step 16.4, RAN 214 may reevaluate the PTM/PTP component flow configuration and may determine if the configuration may be updated based on the analyze at step 13.

MCCH may include an information element (IE) which may be referred to herein as MBMS-SessionInfo-r9 which may contain parameters specific to a session (TMGI, Session ID, . . . ). For example, the IE may include the (e.g., list of) component flows that may (e.g., currently) be delivered in the PTM bearer(s) (e.g., currently delivered). Components that may not be indicated as delivered through PTM may be either available for one or more WTRUs through PTP or currently not delivered at all. For example, the components of the service which may be delivered in PTP may also be included (e.g., added) (e.g., in the list) with information indicating how WTRUs may retrieve component data.

The syntax for signaling (e.g., the list of) PTM delivered flows may be an enumeration of the CFI which may already be known by the WTRU 216 or as bit indicators compressed in a binary word. In a case of a bit field, a convention on the order of component flows may be used to indicate which bit may represent which component. This may be performed through the service announcement, implicitly (using the order of declaration of components) or by providing explicit mapping information.

The IE in MCCH may be updated repeatedly (e.g., periodically).

At step 16.5 and at step 16.6, the RAN 214 may perform the proper synchronization of radio bearer changes for transmission of data over MTCH with the control parameters transmitted in the MCCH.

In a case where a WTRU 216 requests a component that was not transmitted in PTM and the RAN decides to deliver it in PTP, the MCCH signaling may provide to the WTRU 216 the information of the physical resources dedicated to a new PTP bearer.

At step 16.7, the WTRU 216 may receive the component flow data, not previously transmitted in PTM, over dedicated traffic channel (DTCH) using the new PTP bearer. Other components flow may be transmitted either in PTM/PTP according to the steps 16.3-16.6

Hybrid Unicast Multicast Reevaluation with Unicast Signaling

The RAN 214, instead of using MCCH as described in FIG. 16, may issue RRC connection reconfiguration to exchange with WTRU 216 and may provide a reevaluation (e.g. an updated list) of the PTP and PTM radio bearers over which the component flows may be transmitted.

Figure 17:
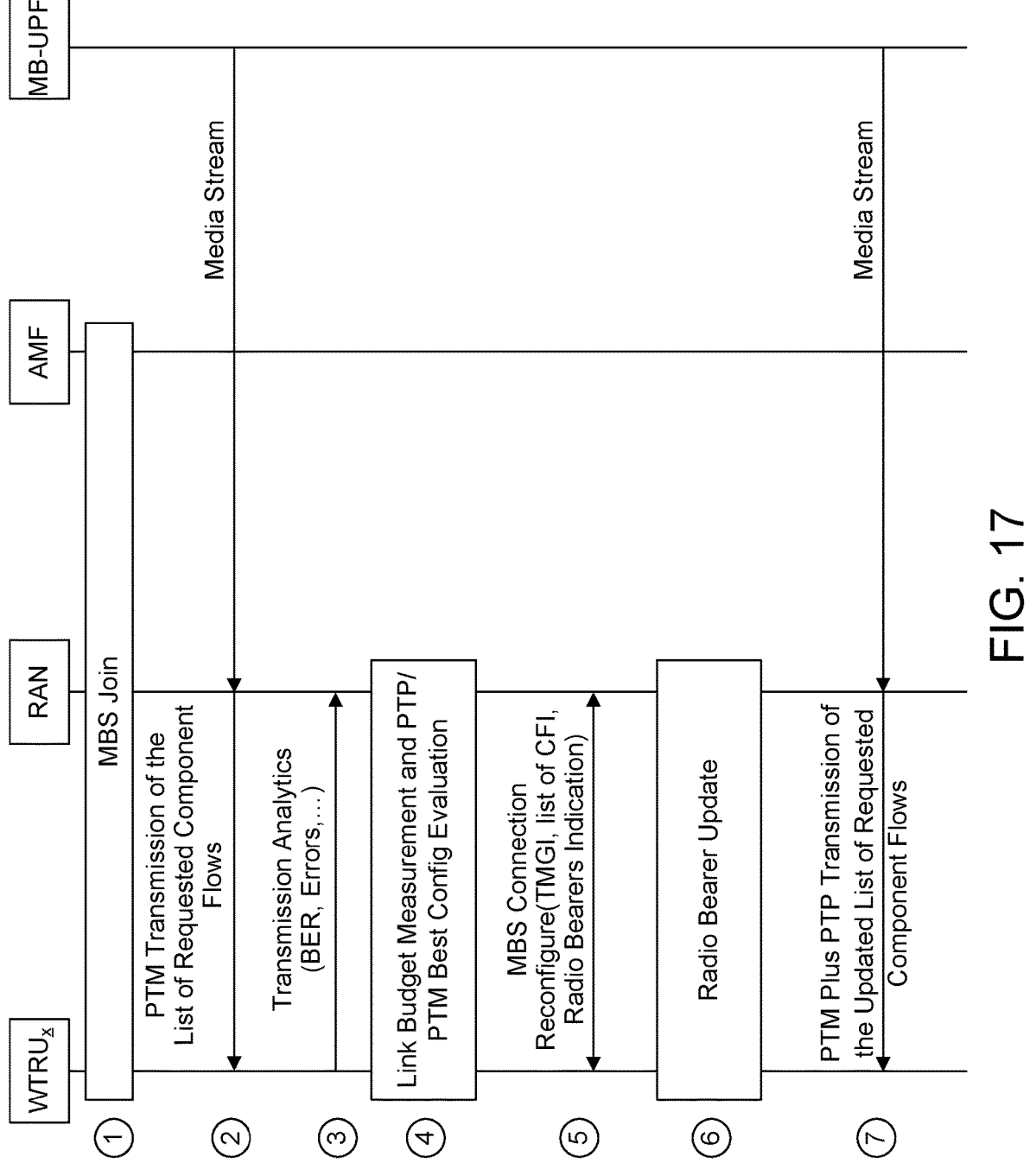
FIG. 17 is a sequence diagram illustrating an example of a hybrid unicast multicast delivery reevaluation via unicast signaling according to FIG. 15.

FIG. 17 is an example of a sequence diagram wherein a reevaluation of the CFI component configuration may be using unicast signaling. For example, FIG. 17 depicts the RRC connection reconfiguration:

At step 17.1, the WTRU 216 may join the MBS session.

At step 17.2, the WTRU 216 may receive the component flows on both PTP and PTM radio bearers that may be determined by the RAN 214, as described at step 15.8 of FIG. 15.

At step 17.3, analyzes of over-the-air transmission (e.g., link budget, BER) may be transmitted to RAN 214.

At step 17.4, RAN 214 may reevaluate the PTM/PTP component flow configuration and may decide if it should be updated.

At step 17.5, the RAN 214 may transmit an MBS connection reconfigure message to provide to the WTRU 216 a new PTM/PTP configuration. It may include any of the TMGI, new (e.g., list of) radio bearers and, the (e.g., list of) CFI of the component(s) (e.g., associated with each of the radio bearers) it may deliver. RAN 214 may arbitrate any of PTP and PTM delivery for different multicast services simultaneously. In that case, TMGI (e.g., a list of TMGI) with the associated radio bearers' parameters may be provided.

At step 17.6, the update of the radio bearers may be performed.

At step 17.7, WTRU 216 may receive the components flows on the determined (e.g., dedicated) bearer.

For example, the MBS connection reconfigure message may be implemented in the form of RRC reconfiguration message including parameters dedicated to multicast radio bearers according to any embodiment described herein.

According to the present embodiments described herein, the WTRU 216 may be a (e.g., any of multicast and unicast) gateway (e.g., wireless box) that may receive multicast flow containing only service components, wherein the service components may be service components requested by devices wirelessly attached to the wireless gateway.

According to an embodiment, a method, implemented by a WTRU, for receiving service components of a MBS, split in multicast and unicast service transmission, from a RAN, node, may comprise the steps of: transmitting, to a network node (e.g., RAN node), a request for service components of an MBS; receiving, from the network node (e.g., RAN node), the requested service components split into unicast and multicast service components associated with radio bearers' indications; establishing the radio bearers with the network node for unicast and multicast transmission of the service components flow; and receiving, from the network node, the service components flow split into unicast and multicast wireless transmission.

The MBS announcement information may be received from a network node (e.g., RAN node) and the method may further comprise transmitting, to the network node (e.g., RAN node), a signal quality. The requested service components may be received from a multicast control channel. The requested service components may be received from a unicast radio resource control procedure.

According to an embodiment, a method, implemented by a network function for transmitting multicast and broadcast service in an encapsulation tunnel, may comprise a step of transmitting a general packet radio service tunneling protocol, GTP, message including a GTP header comprising at least one component flow identifier of a service component of an MBS service.

Example of a Method for Receiving Service Components of a Multicast and Broadcast Service.

FIG. 18 is a flow chart illustrating an example of a method 300 implemented by a WTRU, for receiving service components of a Multicast and Broadcast Service. At step 310, the WTRU may receive, from a network node, multicast and broadcast service, MBS, announcement information, the MBS service announcement information comprising, per announced MBS service, information representative of service components. At step 320, the WTRU may select an announced MBS service and at least one service component of the selected MBS service. At step 330, the WTRU may transmit, to the network node, a message to receive the selected MBS service, the message comprising the at least one selected service component of the selected MBS service. At step 340, and on condition that the at least one selected MBS service is available, the WTRU may receive the at least one selected service component of the selected MBS service, wherein the received at least one selected service component is associated with at least one radio bearer indication.

According to the radio bearer indication, the WTRU may establish the at least one radio bearer with the network node for transmission of a service component flow associated with the at least one service component, such that the WTRU may receive, over the at least one radio bearer and from the network node, the at least one service components flow.

The WTRU may be, or may be configured as and/or configured with elements of, a (e.g., wireless) gateway.

The received at least one selected service component may be associated with unicast transmission or multicast transmission such that the established at least one radio bearer may be for unicast or multicast transmission associated with the at least one selected service component. Accordingly, the at least one received component flow may be received according to its associated multicast or unicast transmission.

The information representative of service components may include a component flow identifier, and the selection of a service component may comprise selecting the component flow identifier of the service component. The type of service components may be associated with component flow identifiers. The type of service components may be any of audio, video and subtitle service. The information representative of service components may include protocol information for receiving data through user datagram protocol or transmission control protocol sockets. Transmitting a message to receive the selected MBS service may comprise sending a request message for joining an MBS session towards an access control and mobility management function of a control plane of a wireless core network. Receiving MBS service announcement information may comprises a request message including a request for selecting service component(s) of an announced MBS service.

The method 300 may further comprise steps of: selecting updated service components of the selected MBS service; transmitting a message to receive the selected MBS service comprising the selected updated service component(s); and on condition that the selected MBS service is available, receiving the selected updated service component(s) of the selected MBS service.

The selected updated service component(s) may comprise any of addition of component(s), removal of components and updated components. Transmitting a message to receive the selected MBS service may be repeated, for example, periodically.

While not explicitly described, the present embodiments may be employed in any combination or sub-combination.

For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instruction.

CONCLUSION

According to the present embodiments described herein, the WTRU 216 may be a (e.g., any of multicast and unicast) gateway (e.g., wireless box) that may receive multicast flow containing only service components, wherein the service components may be service components requested by devices wirelessly attached to the wireless gateway.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to any of, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in any of a WTRU, UE, terminal, base station, RNC, and any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g. RAM) or non-volatile (e.g. ROM) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via application specific integrated circuits (ASICs), field programmable gate arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, mobility management entity (MME) or evolved packet core (EPC), or any host computer. The WTRU may be used m conjunction with modules, implemented in hardware and/or software including a software defined radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a near field communication (NFC) module, a liquid crystal display (LCD) display unit, an organic light-emitting diode (OLED) display unit, a digital music player, a media player, a video game player module, an Internet browser, and/or any Wireless local area network (WLAN) or ultra wide band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

The invention claimed is:

1. A method, implemented by a wireless transmit/receive unit (WTRU), the method comprising:

receiving, from a network node, multicast and broadcast service (MBS) announcement information, the MBS service announcement information comprising, per announced MBS service, information representative of a plurality of service components, wherein the information representative of the plurality of service components includes a plurality of component flow identifiers;

selecting an announced MBS service and one or more of the plurality of component flow identifiers of one or more of the plurality of service components, respectively, of the selected MBS service;

transmitting, to the network node, a first message comprising information indicating the one or more selected component flow identifiers of the selected MBS service;

receiving the one or more of the plurality of service components respectively corresponding to the one or more selected component flow identifiers and one or more radio bearer indications indicating any of unicast and multicast transmission, each of the one or more selected component flow identifiers being respectively associated with a radio bearer indication of the one or more radio bearer indications;

establishing the one or more radio bearers with the network node for transmission of one or more service component flows associated with the one or more selected component flow identifiers; and receiving, over the one or more radio bearers and from the network node, the one or more service component flows.

2. The method of claim 1, wherein the received one or more of the plurality of service components are associated with any of unicast transmission or multicast transmission;

the established one or more radio bearers are for any of unicast or multicast transmission associated with the one or more of the plurality of service components; and the one or more received service component flows are received according to any of its associated multicast or unicast transmission.

3. The method of claim 1, wherein a type of service components is associated with component flow identifiers.

4. The method of claim 3, wherein the type of service components is any of audio, video and subtitle service.

5. The method of claim 1, wherein the information representative of the plurality of service components includes protocol information for receiving data through user datagram protocol or transmission control protocol sockets.

6. The method of claim 1, wherein transmitting a message to receive the selected MBS service comprises sending a request message for joining an MBS session to an access control and mobility management function of a control plane of a wireless core network.

7. The method of claim 1, wherein receiving MBS service announcement information comprises receiving a request message including a request for selecting service component(s) of an announced MBS service.

8. The method of claim 1, wherein the step of transmitting the first message is repeated periodically.

9. The method of claim 1, wherein the WTRU is, is configured as and/or configured with elements of, a gateway.

10. An apparatus comprising circuitry, including any of a transmitter, receiver, processor and memory, configured to:

receive, from a network node, multicast and broadcast service, MBS, announcement information, the MBS service announcement information comprising, per announced MBS service, information representative of a plurality of service components, wherein the information representative of the plurality of service components includes a plurality of component flow identifiers;

select an announced MBS service and one or more of the plurality of component flow identifiers of one or more of the plurality of service components, respectively, of the selected MBS service;

transmit, to the network node, a first message comprising information indicating the one or more selected component flow identifiers of the selected MBS service; and receive, from the network node, the one or more of the plurality of service components respectively corresponding to the one or more selected component flow identifiers and one or more radio bearer indications indicating any of unicast and multicast transmission, each of the one or more selected component flow identifiers being respectively associated with a radio bearer indication of the one or more radio bearer indications;

establish the one or more radio bearers with the network node for transmission one or more service component flows associated with the one or more selected component flow identifiers; and receive, over the one or more radio bearers and from the network node, the one or more service component flows.

11. The apparatus of claim 10, wherein the received one or more of the plurality of service components are associated with any of unicast transmission or multicast transmission;

the established one or more radio bearers are for any of unicast or multicast transmission associated with the one or more of the plurality of service components; and the one or more received service component flows are received according to any of its associated multicast or unicast transmission.

12. The apparatus of claim 10, wherein a type of service components is associated with component flow identifiers.

13. The apparatus of claim 12, wherein the type of service components is any of audio, video and subtitle service.

14. The apparatus of claim 10, wherein the information representative of the plurality of service components includes protocol information for receiving data through user datagram protocol or transmission control protocol sockets.

15. The apparatus of claim 10, wherein transmitting a message to receive the selected MBS service comprises sending a request message for joining an MBS session towards an access control and mobility management function of a control plane of a wireless core network.

16. The apparatus of claim 10, wherein receiving MBS service announcement information comprises receiving a request message including a request for selecting service component(s) of an announced MBS service.

17. The apparatus of claim 10, wherein the apparatus is, is configured as and/or configured with elements of, a wireless transmit/receive unit (WTRU).

18. The apparatus of claim 17, wherein the WTRU is, is configured as and/or configured with elements of, a gateway.

* * * * *